US011533477B2

(12) United States Patent
Liu et al.

(10) Patent No.: US 11,533,477 B2
(45) Date of Patent: Dec. 20, 2022

(54) WEIGHTING FACTORS FOR PREDICTION SAMPLE FILTERING IN INTRA MODE

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/587,875

(22) Filed: Jan. 28, 2022

(65) Prior Publication Data
US 2022/0159242 A1 May 19, 2022

Related U.S. Application Data

(63) Continuation of application No. PCT/CN2020/109217, filed on Aug. 14, 2020.

(30) Foreign Application Priority Data

Aug. 14, 2019 (WO) ................ PCT/CN2019/100615

(51) Int. Cl.
*H04N 19/137* (2014.01)
*H04N 19/105* (2014.01)
(Continued)

(52) U.S. Cl.
CPC ......... *H04N 19/105* (2014.11); *H04N 19/117* (2014.11); *H04N 19/167* (2014.11); *H04N 19/176* (2014.11); *H04N 19/196* (2014.11)

(58) Field of Classification Search
CPC .. H04N 19/105; H04N 19/117; H04N 19/167; H04N 19/176; H04N 19/196
See application file for complete search history.

(56) References Cited

U.S. PATENT DOCUMENTS 9,031,129 B2   5/2015 Xu et al.
9,544,612 B2   1/2017 Deng et al.
(Continued)

FOREIGN PATENT DOCUMENTS

CN    1535027 A     10/2004
CN    103596004 A    2/2014
(Continued)

OTHER PUBLICATIONS

US 11,463,727 B2, 10/2022, Kim (withdrawn)
(Continued)

*Primary Examiner* — William C Vaughn, Jr.
*Assistant Examiner* — Naod W Belai
(74) *Attorney, Agent, or Firm* — Perkins Coie LLP

(57) ABSTRACT

A video processing method is provided to include: deriving weighting factors for neighboring samples of samples of a current video block of a video according to a rule; and performing a conversion between the current video block and a coded representation of the video, and wherein the rule specifies that, in case that the current video block is coded using a planar mode or a DC mode, the weighting factors are determined from at least one of a dimension of the current video block or positions of the samples of the current video block, wherein the current video block uses a PDPC method that combines the neighboring samples with a prediction signal of the current video block to generate a refined prediction signal, and wherein a weighting factor of a
(Continued)

prediction signal of a sample is determined based on weighting factors of corresponding neighboring samples of the sample.

20 Claims, 16 Drawing Sheets

(51) Int. Cl.
　　　*H04N 19/117*　　　(2014.01)
　　　*H04N 19/167*　　　(2014.01)
　　　*H04N 19/176*　　　(2014.01)
　　　*H04N 19/196*　　　(2014.01)

(56) References Cited

U.S. PATENT DOCUMENTS

| | | | |
|---|---|---|---|
| 9,743,066 | B2 | 8/2017 | Zhang et al. |
| 10,321,130 | B2 | 6/2019 | Dong et al. |
| 10,306,240 | B2 | 8/2019 | Xiu et al. |
| 10,687,079 | B2 | 6/2020 | Liu et al. |
| 10,764,576 | B2 | 9/2020 | Li et al. |
| 11,445,174 | B2 | 9/2022 | Zhao et al. |
| 2014/0064360 | A1 | 3/2014 | Rapaka et al. |
| 2017/0244966 | A1 | 8/2017 | Joshi et al. |
| 2019/0104303 | A1 | 4/2019 | Xiu et al. |
| 2019/0110045 | A1 | 4/2019 | Zhao et al. |
| 2019/0166370 | A1 | 5/2019 | Xiu et al. |
| 2019/0238864 | A1 | 8/2019 | Xiu et al. |
| 2020/0092563 | A1 | 3/2020 | Drugeon et al. |
| 2020/0252640 | A1* | 8/2020 | Zhao ............... H04N 19/51 |
| 2020/0359016 | A1 | 11/2020 | Li et al. |
| 2020/0359017 | A1 | 11/2020 | Li et al. |
| 2020/0359018 | A1 | 11/2020 | Li et al. |
| 2021/0014506 | A1 | 1/2021 | Zhang et al. |
| 2021/0211654 | A1 | 7/2021 | Zhang et al. |
| 2021/0250592 | A1 | 8/2021 | Xiu et al. |
| 2021/0250599 | A1 | 8/2021 | Zhao et al. |
| 2021/0266587 | A1 | 8/2021 | Liu et al. |
| 2021/0274167 | A1 | 9/2021 | Liu et al. |
| 2021/0329248 | A1 | 10/2021 | Deng et al. |
| 2021/0392371 | A1 | 12/2021 | Lee et al. |
| 2022/0007059 | A1 | 1/2022 | Deng et al. |
| 2022/0046232 | A1 | 2/2022 | Piao et al. |

FOREIGN PATENT DOCUMENTS

| | | |
|---|---|---|
| CN | 108702515 A | 10/2018 |
| EP | 3997872 A | 5/2022 |
| KR | 20100123841 A | 11/2010 |
| WO | 2017058635 A1 | 4/2017 |
| WO | 2018039596 A1 | 3/2018 |

OTHER PUBLICATIONS

"CE3-related: disabling PDPC based on availability of reference samples" JVET-M0358, Joint Video Experts Team (JVET) of ITU-T SG 16 WP 3 and ISOMEC JTC 1/SC 29/WG 1113th Meeting: Marrakech, MA, Jan. 9-18, 2019. (Year: 2019).*
Bross et al. Versatile Video Coding (Draft 6), JVET-O2001-vE, 455 Pages. Joint Video Experts Team (JVET)of ITU-T SG 16 WP 3 and ISO/IEC JTC 1/SC 29/WG 11 15th Meeting: Gothenburg, SE, Jul. 3-12, 2019, hereinafter "Bross". (Year: 2019).*

Bross et al. "Versatile Video Coding (Draft 6)," Joint Video Experts Team (JVET) of ITU-T SG 16 WP 3 and ISO/IEC JTC 1/SC 29/WG 11, 15th Meeting, Gotehnburg, SE, Jul. 3-12, 2019, document JVET-O2001, 2019.
Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "Algorithm Description for Versatile Video Coding and Test Model 2 (VTM 2)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K1002, 2018.
Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1002, 2019.
De-Luxán-Hernández et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Karczewicz et al. "Geometry Transformation-based Adaptive In-Loop Filter," 2016 IEEE, Picture Coding Symposium (PCS), 2016.
Karczewicz et al. "CE8-Related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.
http://phenix.it-sudparis.eu/jvet/doc_end_user/documents/15_Gothenburg/wg11/JVET-O2001-v14.zip.
https://vcgit.hhi.fraunhofer.de/jvet/VVCSoftware_VTM/tags/VTM-5.2.
International Search Report and Written Opinion from International Patent Application No. PCT/CN2020/109207 dated Nov. 19, 2020 (10 pages).
International Search Report and Written Opinion from International Patent Application No. PCT/CN2020/109217 dated Nov. 20, 2020 (9 pages).
Non-Final Office Action from U.S. Appl. No. 17/587,768 dated Apr. 1, 2022.
Van Der Auwera et al. "Extension of Simplified PDPC to Diagonal Intra Modes," Joint Video Experts Team (JVET) of ITU-T SG 16 WP 3 and ISO/IEC JTC 1/SC 29/WG 11 10th Meeting, San Diego, USA Apr. 10-20, 2018, document JVET-J0069, 2018. (cted in EP20851995.9 EESR mailed Sep. 27, 2022).
Xu et al. "Recent Advances in Video Coding Beyond the HEVC Standard," APSIPA Transactions on Signal and Infomnation Processing, Jun. 25, 2019, 8(e18):1-10. (cited in EP20851995.9 EESR mailed Sep. 27, 2022).
Extended European Search Report from European Patent Application No. 20851995.9 dated Sep. 27, 2022 (12 pages).
Examination Report fron Indian Patent Application No. 202247007760 dated Oct. 7, 2022 (6 pages).
Advisory Action from U.S. Appl. No. 17/587,768 dated Oct. 11, 2022.

* cited by examiner

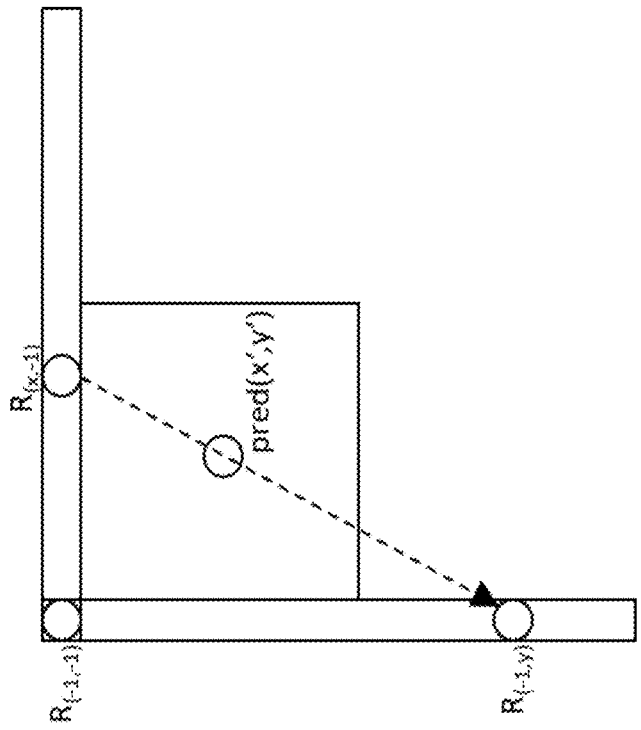
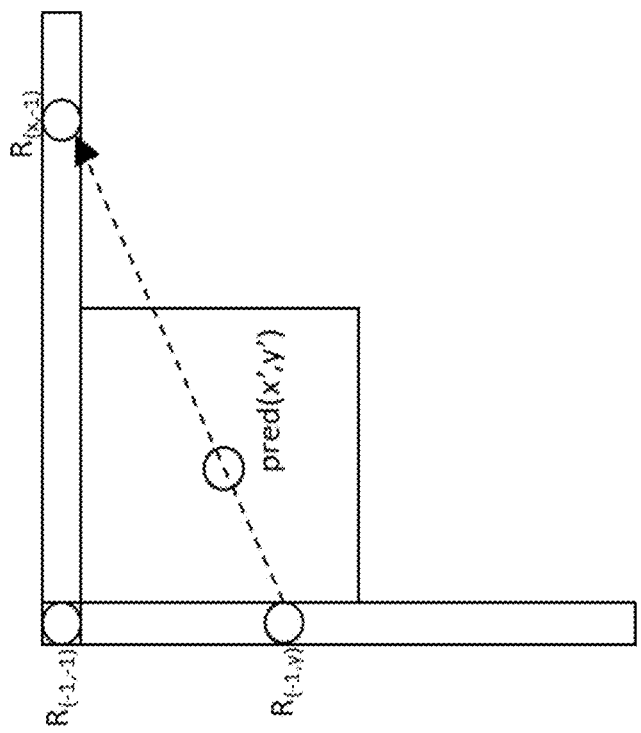
FIG. 5D
FIG. 5C

WEIGHTING FACTORS FOR PREDICTION SAMPLE FILTERING IN INTRA MODE

CROSS REFERENCE TO RELATED APPLICATIONS

This application is a continuation of International Patent Application No. PCT/CN2020/109217, filed on Aug. 14, 2020, which claims the priority to and benefits of International Patent Application No. PCT/CN2019/100615, filed on Aug. 14, 2019. All the aforementioned patent applications are hereby incorporated by reference in their entireties

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for performing video coding or decoding using intra prediction sample filtering.

In one example aspect, a method of video processing is disclosed. The method includes deriving weighting factors for neighboring samples of samples of a current video block of a video according to a rule; and performing a conversion between the current video block and a coded representation of the video, and wherein the rule specifies that, in case that the current video block is coded using a planar mode or a DC mode, the weighting factors are determined from at least one of a dimension of the current video block or positions of the samples of the current video block, wherein the current video block uses a position dependent intra prediction (PDPC) method that combines the neighboring samples with a prediction signal of the current video block to generate a refined prediction signal of the current video block, and wherein a weighting factor of a prediction signal of a sample is determined based on weighting factors of corresponding neighboring samples of the sample.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIGS. 5A to 5D illustrate definitions of reference samples.

DETAILED DESCRIPTION

Figure 1:
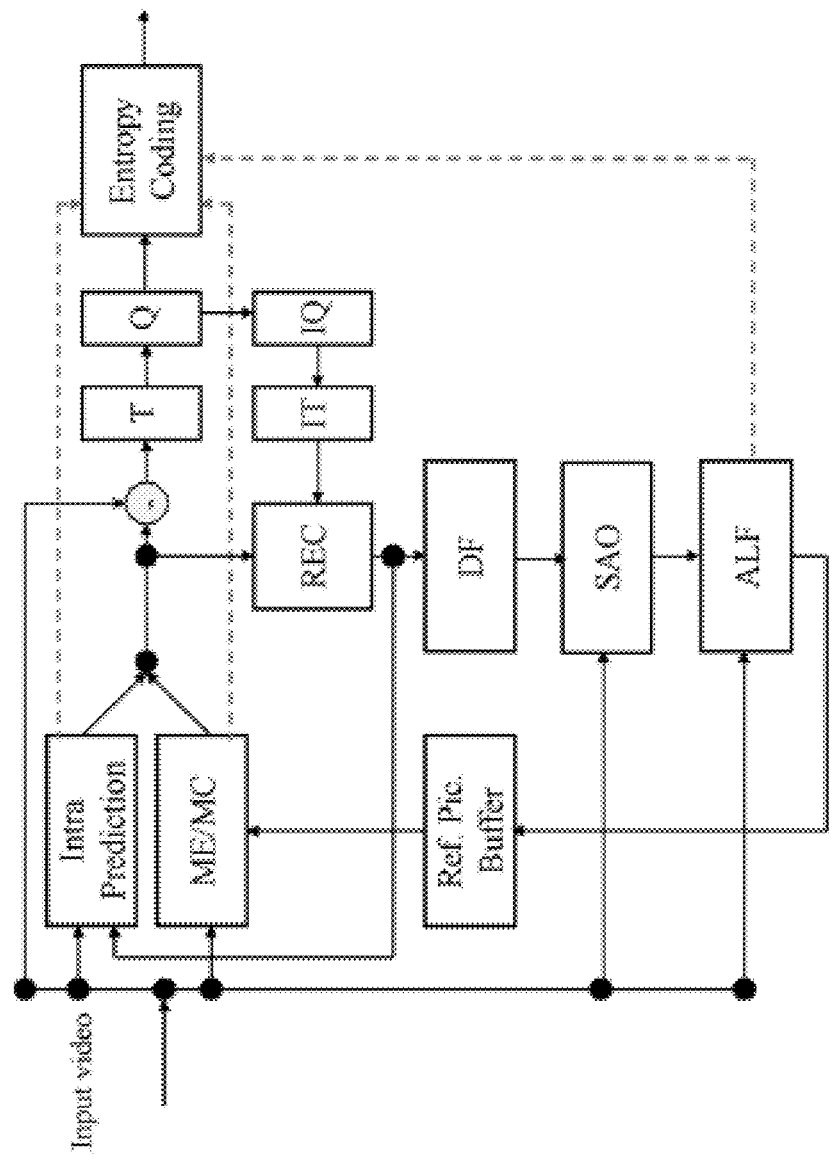
FIG. 1 shows an example of encoder block diagram.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to intra prediction in image/video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 6) could be found at: http://phenix.it-sudparis.eu/jvet/doc_end_user/documents/15_Gothenburg/wg11/JVET-O2001-v14.zip The latest reference software of VVC, named VTM, could be found at: https://vcgit.hhi.fraunhofer.de/jvet/VVCSoftware_VTM/tags/VTM-5.2

2.1 Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 4:4:4

Each of the three Y'CbCr components have the same sample rate, thus there is no chroma subsampling. This scheme is sometimes used in high-end film scanners and cinematic post production.

2.1.2 4:2:2

The two chroma components are sampled at half the sample rate of luma: the horizontal chroma resolution is halved. This reduces the bandwidth of an uncompressed video signal by one-third with little to no visual difference 2.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

2.2 Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3 Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
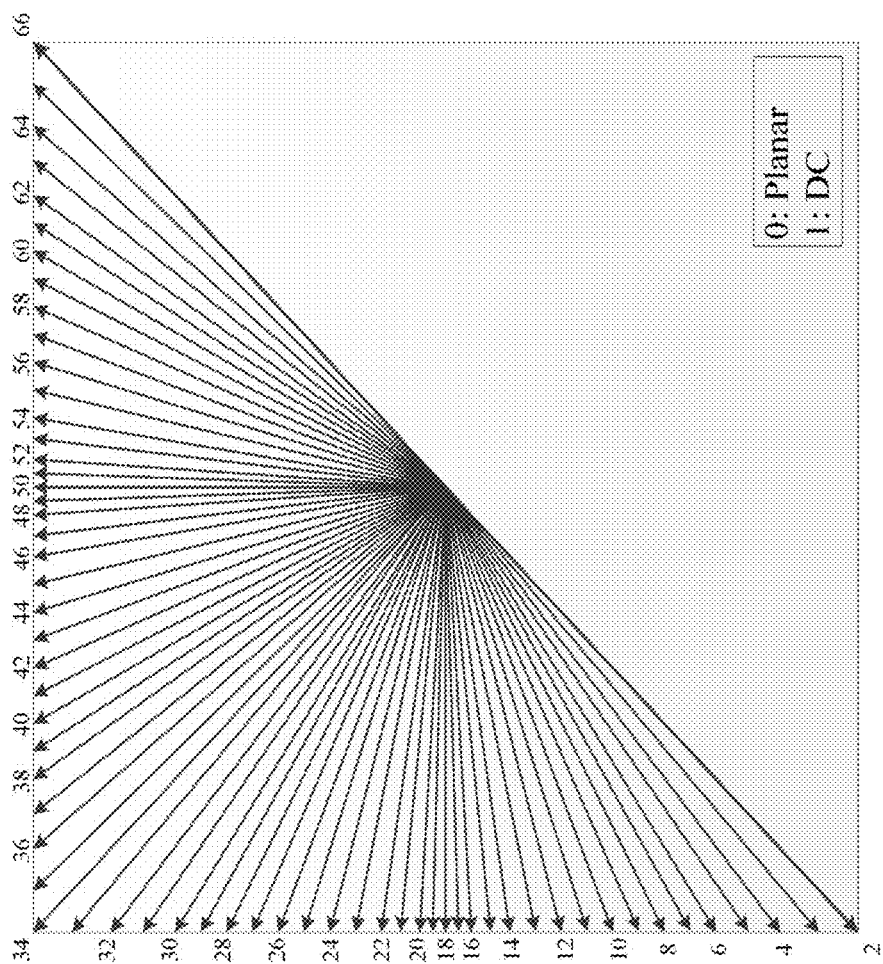
FIG. 2 shows an example of 67 intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

FIG. 2 shows an example of 67 intra prediction modes.

2.4 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, i.e., 67, and the intra mode coding is unchanged.

Figure 3A:
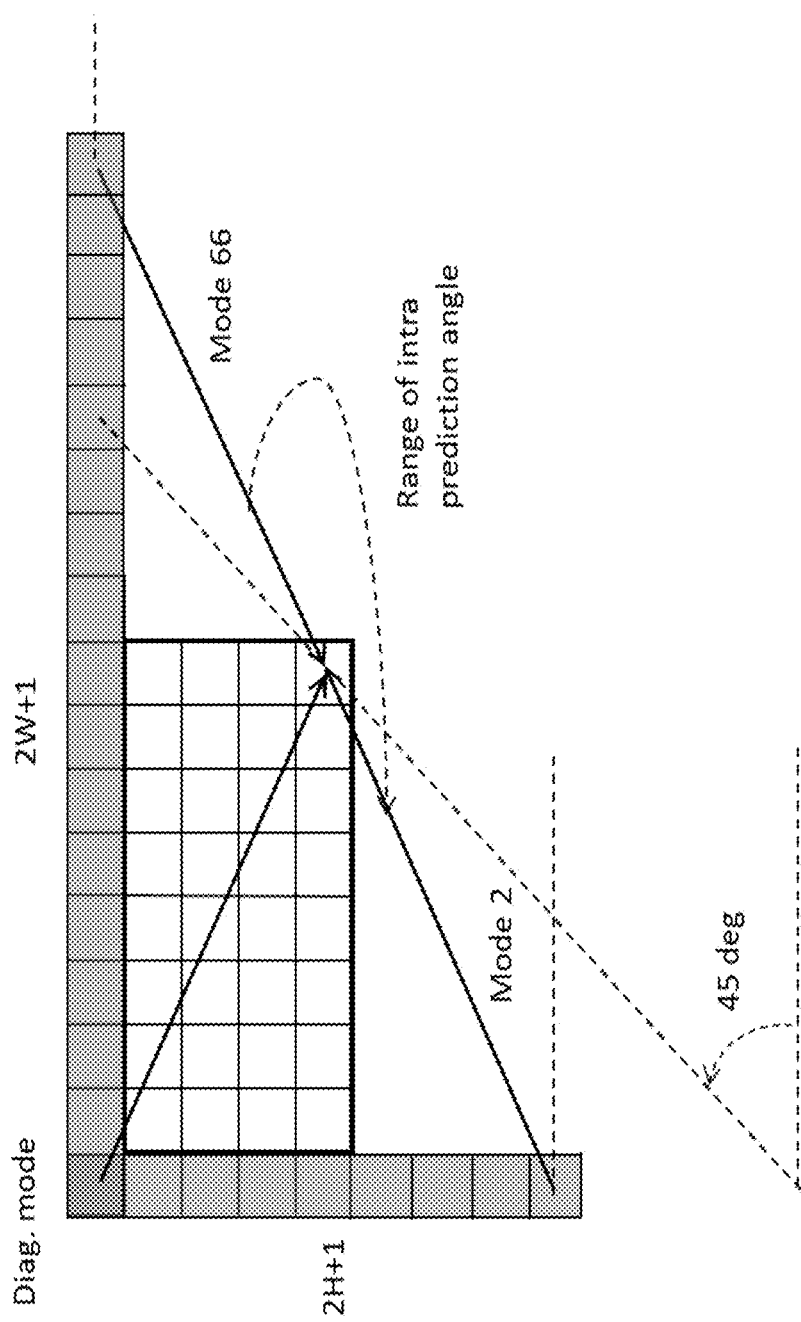
FIGS. 3A and 3B show examples of reference samples for wide-angular intra prediction.
Figure 3B:
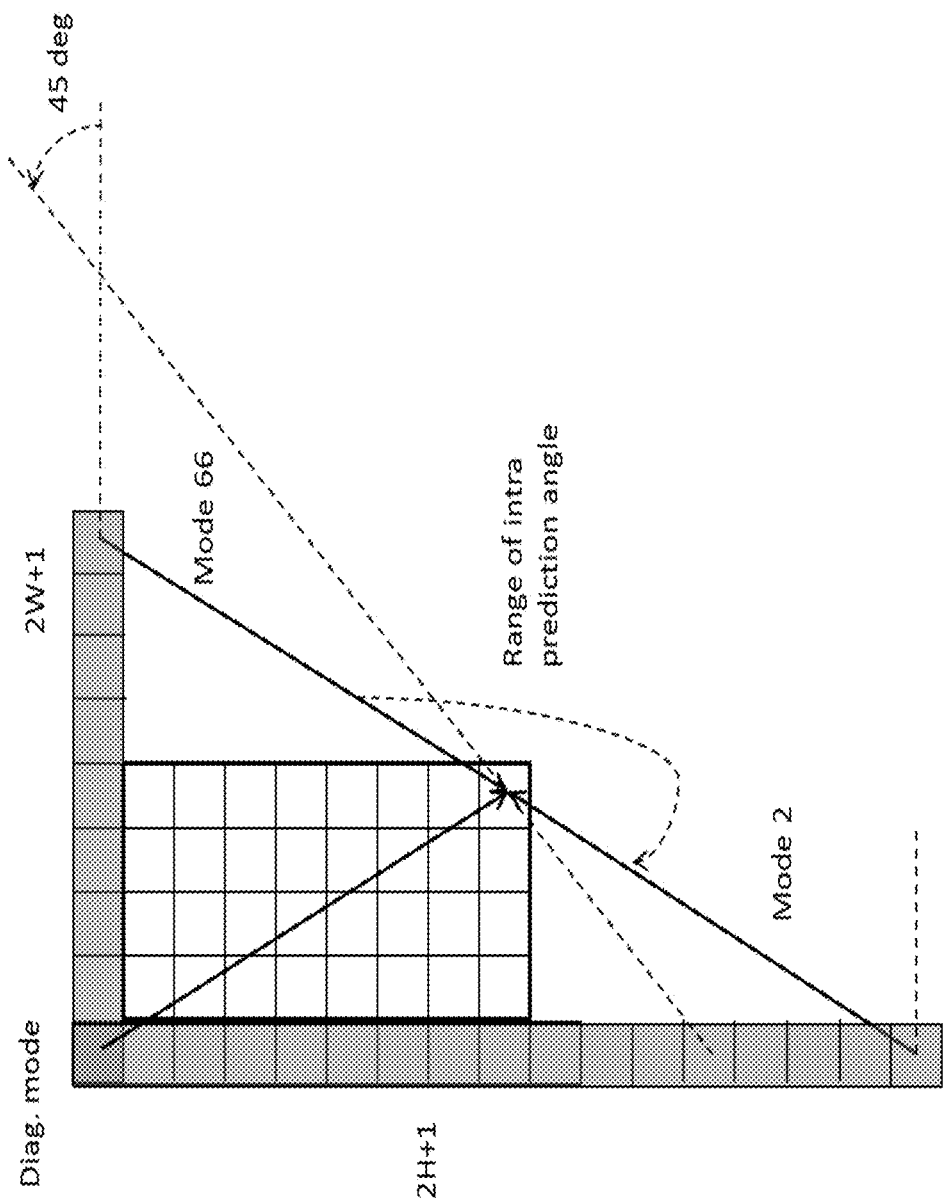

FIG. 3A-3B show examples of reference samples for wide-angular intra prediction.

To support these prediction directions, the top reference with length 2 W+1, and the left reference with length 2H+1, are defined as shown in FIG. 3A-3B.

The mode number of replaced mode in wide-angular direction mode is dependent on the aspect ratio of a block. The replaced intra prediction modes are illustrated in Table 2-1.

TABLE 2-1

Intra prediction modes replaced by wide-angular modes

| Condition | Replaced intra prediction modes |
|---|---|
| W/H == 2 | Modes 2,3,4,5,6,7 |
| W/H > 2 | Modes 2,3,4,5,6,7,8,9,10,11 |
| W/H == 1 | None |
| H/W == 1/2 | Modes 61,62,63,64,65,66 |
| H/W < 1/2 | Mode 57,58,59,60,61,62,63,64,65,66 |

Figure 4:
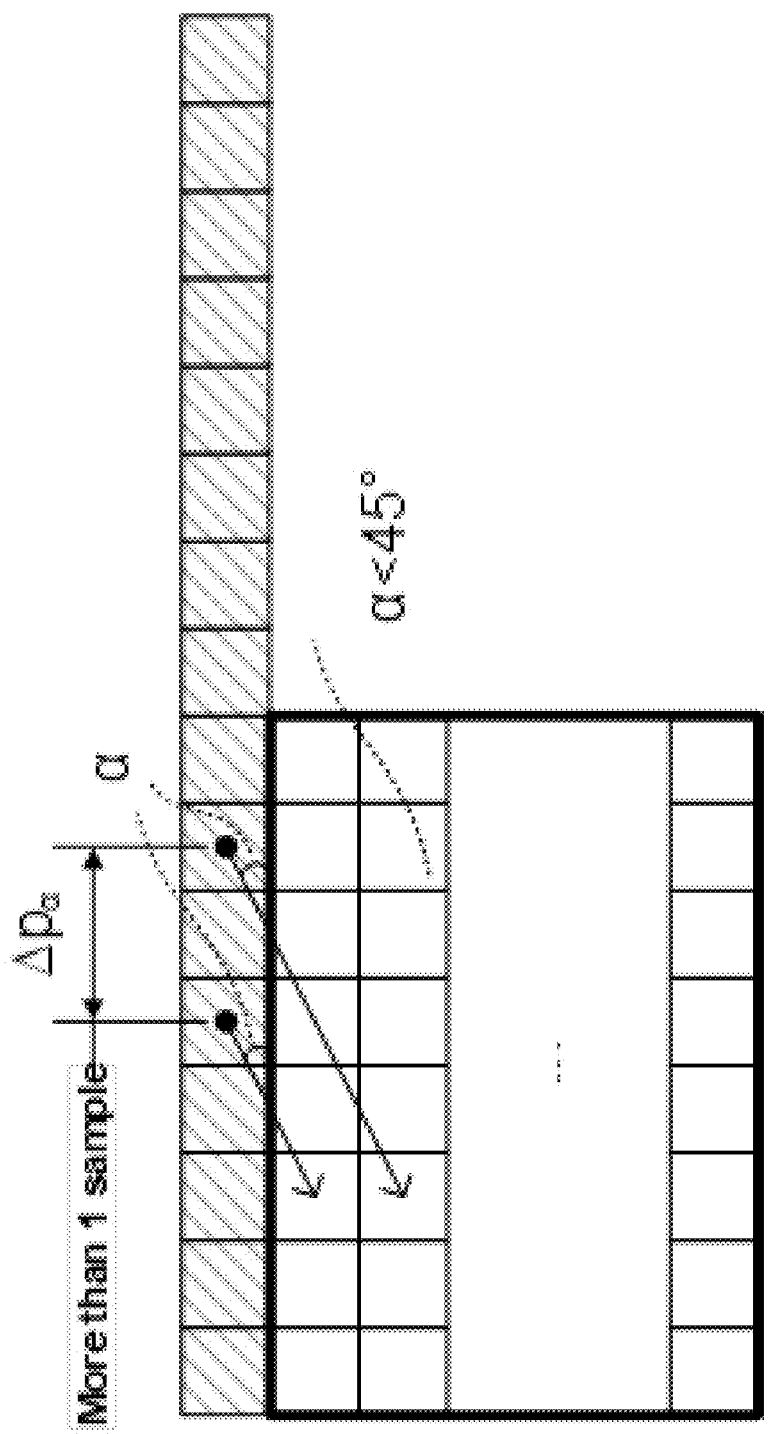
FIG. 4 illustrates a problem of discontinuity in case of directions beyond 45 degree.

FIG. 4 illustrates a problem of discontinuity in case of directions beyond 45 degree.

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.5 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The internal prediction sample pred(x,y) is predicted using an intra prediction mode (DC, planar, angular) and a linear combination of reference samples according to the Equation may be further applied to generate the final prediction sample pred(x,y) as follows:

$$\text{pred}(x,y) = (wL \times R_{(-1,y)} + wT \times R_{(x,-1)} - wTL \times R_{(-1,-1)} + (64 - wL - wT + wTL) \times \text{pred}(x,y) + 32) >> 6 \quad (2\text{-}1)$$

where $R_{(x,-1)}$, $R_{(-1,y)}$ represent the reference samples located at the top and left of current sample (x, y), respectively, and $R_{(-1,-1)}$ represents the reference sample located at the top-left corner of the current block.

If PDPC is applied to DC, planar, horizontal, and vertical intra modes, additional boundary filters are not needed, which are required in the case of HEVC DC mode boundary filter or horizontal/vertical mode edge filters.

FIGS. 5A-5D illustrate the definition of reference samples ($R_{(x,-1)}$, $R_{(-1,y)}$ and $R_{(-1,-1)}$) for PDPC applied over various prediction modes. The prediction sample pred(x', y') is located at (x', y') within the prediction block. The coordinate x of the reference sample $R_{(x,-1)}$ is given by: x=x'+y'+1, and the coordinate y of the reference sample $R_{(-1,y)}$ is similarly given by: y=x'+y'+1.

Figure 5B:
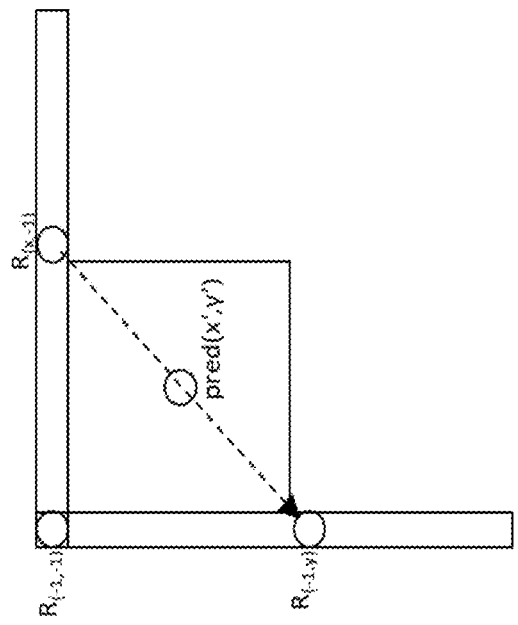
Figure 5A:
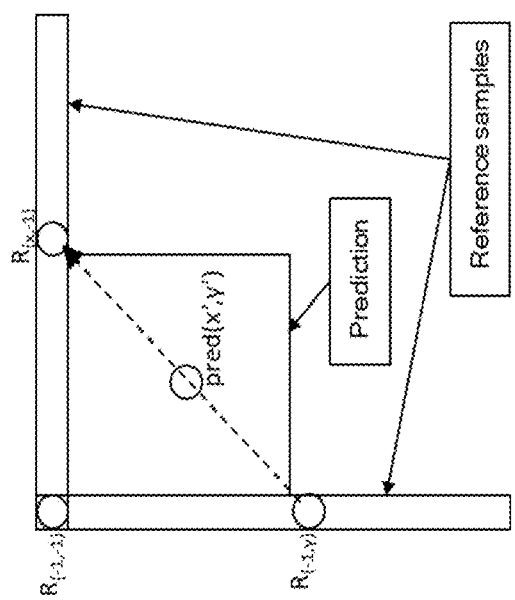

FIGS. 5A-5D show example definition of samples used by PDPC applied to diagonal and adjacent angular intra modes. FIG. 5A shows a diagonal top-right mode example. FIG. 5B shows a diagonal bottom-left mode example. FIG. 5C shows an adjacent diagonal top-right mode example. FIG. 5D shows an adjacent diagonal bottom-left mode example.

The PDPC weights are dependent on prediction modes and are shown in Table 2-2.

TABLE 2-2

Example of PDPC weights according to prediction modes

| Prediction modes | wT | wL | wTL |
|---|---|---|---|
| Diagonal top-right | 16 >> ( (y' << 1 ) >> shift) | 16 >> ( (x' << 1 ) >> shift) | 0 |
| Diagonal bottom-left | 16 >> ( ( y' << 1 ) >> shift ) | 16 >> ( (x' << 1 ) >> shift ) | 0 |
| Adjacent diagonal top-right | 32 >> ( ( y' << 1 ) >> shift ) | 0 | 0 |
| Adjacent diagonal bottom-left | 0 | 32 >> ( ( x' << 1 ) >> shift ) | 0 |

The detailed description for PDPC in VVC draft 6 is as follows.

8.4.5.2.5 General Intra Sample Prediction

Inputs to this process are:
- a sample location (xTbCmp, yTbCmp) specifying the top-left sample of the current transform block relative to the top-left sample of the current picture,
- a variable predModeIntra specifying the intra prediction mode,
- a variable nTbW specifying the transform block width,
- a variable nTbH specifying the transform block height,
- a variable nCbW specifying the coding block width,
- a variable nCbH specifying the coding block height,
- a variable cIdx specifying the colour component of the current block.

Outputs of this process are the predicted samples predSamples[x][y], with x=0 ... nTbW−1, y=0 ... nTbH−1.

The variables refW and refH are derived as follows:
If IntraSubPartitionsSplitType is equal to ISP_NO_SPLIT or cIdx is not equal to 0, the following applies:

$$\text{refW} = nTbW*2 \quad (8\text{-}118)$$

$$\text{refH} = nTbH*2 \quad (8\text{-}119)$$

Otherwise (IntraSubPartitionsSplitType is not equal to ISP_NO_SPLIT and cIdx is equal to 0), the following applies:

$$\text{refW} = nCbW + nTbW \quad (8\text{-}120)$$

$$\text{refH} = nCbH + nTbH \quad (8\text{-}121)$$

The variable refIdx specifying the intra prediction reference line index is derived as follows:

$$\text{refIdx} = (c\text{Idx}==0)?\text{IntraLumaRefLineIdx}[xTbCmp][yTbCmp]:0 \quad (8\text{-}122)$$

The wide angle intra prediction mode mapping process as specified in clause 8.4.5.2.6 is invoked with predModeIntra, nTbW, nTbH and cIdx as inputs, and the modified predModeIntra as output.

The variable refFilterFlag is derived as follows:
If predModeIntra is equal to one of the following values: 0, −14, −12, −10, −6, 2, 34, 66, 72, 76, 78, 80, then refFilterFlag is set equal to 1.
Otherwise, refFilterFlag is set equal to 0.

For the generation of the reference samples p[x][y] with x=−1−refIdx, y=−1−refIdx ... refH−1 and x=−refIdx ... refW−1, y=−1−refIdx, the following ordered steps apply:
1. The reference sample availability marking process as specified in clause 8.4.5.2.7 is invoked with the sample location (xTbCmp, yTbCmp), the intra prediction reference line index refIdx, the reference sample width refW, the reference sample heightrefH, the colour component index cIdx as inputs, and the reference samples refUnfilt[x][y] with x=−1−refIdx, y=−1−refIdx ... refH−1 and x=−refIdx ... refW−1, y=−1−refIdx as output.
2. When at least one sample refUnfilt[x][y] with x=−1−refIdx, y=−1−refIdx ... refH−1 and x=−refIdx ... refW−1, y=−1−refIdx is marked as "not available for intra prediction", the reference sample substitution process as specified in clause 8.4.5.2.8 is invoked with the intra prediction reference line index refIdx, the reference sample width refW, the reference sample heightrefH, the reference samples refUnfilt[x][y] with x=−1−refIdx, y=−1−refIdx ... refH−1 and x=

−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.
3. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

If predModeIntra is equal to INTRA_PLANAR, the corresponding intra prediction mode process specified in clause 8.4.5.2.10 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.5.2.11 is invoked with the transform block width nTbW, the transform block height nTbH, the intra prediction reference line index refIdx, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.5.2.13 is invoked with the intra prediction mode predModeIntra, the sample location (xTbC, yTbC) set equal to (xTbCmp, yTbCmp), the transform block width nTbW and height nTbH, the colour component index cIdx, and the reference sample array p as inputs, and the output is the predicted sample array predSamples.

Otherwise, the corresponding intra prediction mode process specified in clause 8.4.5.2.12 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the reference filter flag refFilterFlag, the colour component index cIdx, and the reference sample array p as inputs, and the predicted sample array predSamples as outputs.

When all of the following conditions are true, the position-dependent prediction sample filtering process specified in clause 8.4.5.2.14 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

nTbW is greater than or equal to 4 and nTbH is greater than or equal to 4 or cIdx is not equal to 0
refIdx is equal to 0 or cIdx is not equal to 0
BdpcmFlag[xTbCmp][xTbCmp] is equal to 0
One of the following conditions is true:
predModeIntra is equal to INTRA_PLANAR
predModeIntra is equal to INTRA_DC
predModeIntra is less than or equal to INTRA_ANGULAR18
predModeIntra is less than or equal to INTRA_ANGULAR50

8.4.5.2.14 Position-Dependent Intra Prediction Sample Filtering Process

Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighbouring samples p[x][y], with x=−1, y=−1 . . . refH−1 and x=0 . . . refW−1, y=−1,
a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:
If cIdx is equal to 0, clip1Cmp is set equal to $Clip1_Y$.
Otherwise, clip1Cmp is set equal to $Clip1_C$.

The variable nScale is derived as follows:
If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
Otherwise, if predModeIntra is less than INTRA_ANGULAR18, nScale is set equal to Min(2, Log 2(nTbW)−Floor(Log 2(3*invAngle−2))+8), using invAngle as specified in clause 8.4.5.2.12.
Otherwise, nSacle is set to ((Log 2(nTbW)+Log 2(nTbH)−2)>>2).

The reference sample arrays mainRef[x] and sideRef[y], with x=0 . . . refW−1 and y=0 . . . refH−1 are derived as follows:

$$\text{mainRef}[x]=p[x][-1] \tag{8-244}$$

$$\text{sideRef}[y]1=p[-1][y]$$

The variables refL[x][y], refT[x][y], wT[y], wL[x] and wTL[x][y] with x=0 . . . nTbW−1, y=0 . . . nTbH−1 are derived as follows:

If predModeIntra is equal to INTRA_PLANAR or INTRA_DC, the following applies:

$$\text{ref}L[x][y]=p[-1][y] \tag{8-245}$$

$$\text{ref}T[x][y]=p[x][-1] \tag{8-246}$$

$$wT[y]=32>>((y<<1)>>n\text{Scale}) \tag{8-247}$$

$$wL[x]=32>>((x<<1)>>n\text{Scale}) \tag{8-248}$$

$$wTL[x][y]=0 \tag{8-249}$$

Otherwise, if predModeIntra is equal to INTRA_ANGULAR18 or INTRA_ANGULAR50, the following applies:

$$\text{ref}L[x][y]=p[-1][y] \tag{8-250}$$

$$\text{ref}T[x][y]=p[x][-1] \tag{8-251}$$

$$wT[y]=(\text{predModeIntra}==\text{INTRA\_ANGULAR18})\\?32>>((y<1)>>n\text{Scale}):0 \quad (8\text{-}252)$$

$$wL[x]=(\text{predModeIntra}==\text{INTRA\_ANGULAR50})\\?32>>((x<1)>>n\text{Scale}):0 \quad (8\text{-}253)$$

$$wTL[x][y]=(\text{predModeIntra}==\text{INTRA\_ANGULAR18})\\?wT[y]:wL[x] \quad (8\text{-}254)$$

Otherwise, if predModeIntra is less than INTRA_ANGULAR18 and nScale is equal to or greater than 0, the following ordered steps apply:

1. The variables dXInt[y] and dX[x][y] are derived as follows using invAngle as specified in clause 8.4.5.2.12 depending on intraPredMode:

$$dX\text{Int}[y]=((y+1)*\text{invAngle}+256)>>9 \quad (8\text{-}255)$$

$$dX[x][y]=x+dX\text{Int}[y]$$

2. The variables refL[x][y], refT[x][y], wT[y], wL[x] and wTL[x][y] are derived as follows:

$$\text{refL}[x][y]=0 \quad (8\text{-}256)$$

$$\text{refT}[x][y]=(y<(3<<n\text{Scale}))?\text{mainRef}[dX[x][y]]:0 \quad (8\text{-}257)$$

$$wT[y]=32>>((y<<1)>>n\text{Scale}) \quad (8\text{-}258)$$

$$wL[x]=0 \quad (8\text{-}259)$$

$$wTL[x][y]=0 \quad (8\text{-}260)$$

Otherwise, if predModeIntra is greater than INTRA_ANGULAR50 and nScale is equal to or greater than 0, the following ordered steps apply:

1. The variables dYInt[x] and dY[x][y] are derived as follows using invAngle as specified in clause 8.4.5.2.12 depending on intraPredMode:

$$dY\text{Int}[x]=((x+1)*\text{invAngle}+256)>>9 \quad (8\text{-}261)$$

$$dY[x][y]=y+dY\text{Int}[x]$$

2. The variables refL[x][y], refT[x][y], wT[y], wL[x] and wTL[x][y] are derived as follows:

$$\text{refL}[x][y]=(y<(3<<n\text{Scale}))?\text{sideRef}[dY[x][y]]:0 \quad (8\text{-}262)$$

$$\text{refT}[x][y]=0 \quad (8\text{-}263)$$

$$wT[y]=0 \quad (8\text{-}264)$$

$$wL[x]=32>>((x<<1)>>n\text{Scale}) \quad (8\text{-}265)$$

$$wTL[x][y]=0 \quad (8\text{-}266)$$

Otherwise, refL[x][y], refT[x][y], wT[y], wL[x] and wTL[x][y] are all set equal to 0.

The values of the modified predicted samples predSamples[x][y], with x=0 . . . nTbW−1, y=0 . . . nTbH−1 are derived as follows:

$$\text{predSamples}[x][y]=\text{clip1Cmp}((\text{refL}[x][y]*wL[x]+\text{refT}\\{}[x][y]*wT[y]-p[-1][-1]*wTL[x][y]+(64-wL[x]-\\wT[y]+wTL[x][y])*\text{predSamples}[x][y]+32)>>6) \quad (8\text{-}267)$$

2.6 Intra Subblock Partitioning (ISP)

Figure 6:
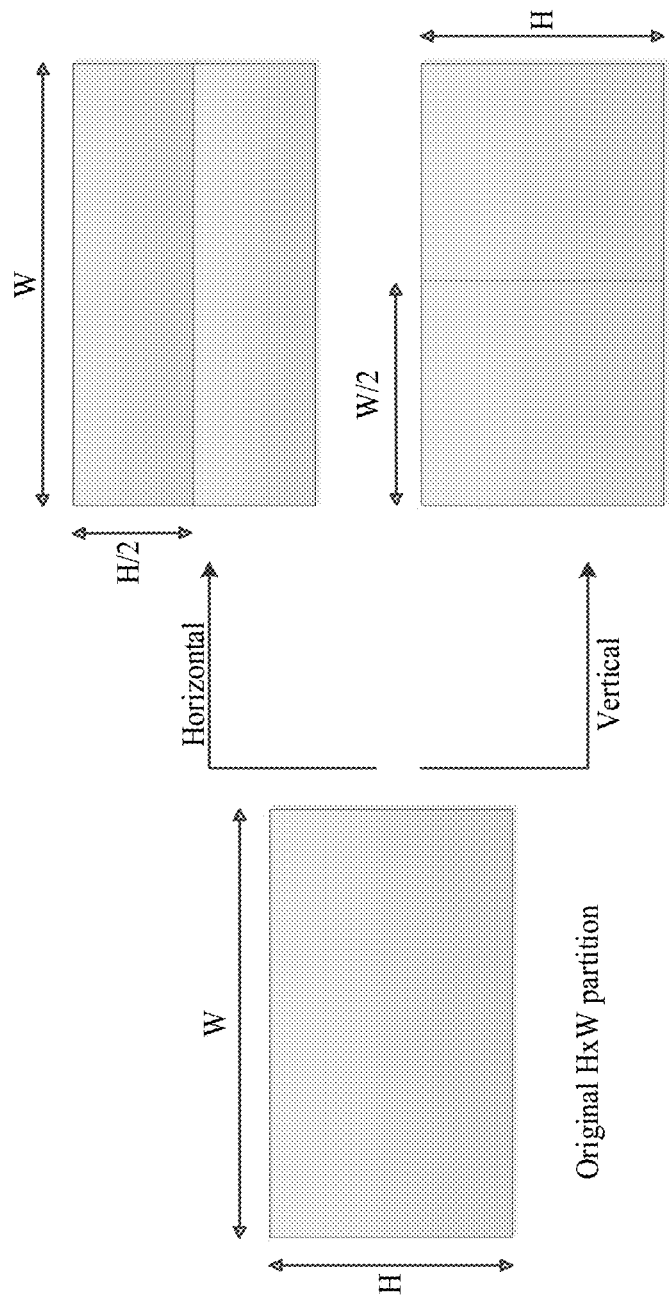
FIG. 6 shows an example of division of 4×8 and 8×4 blocks.
Figure 7:
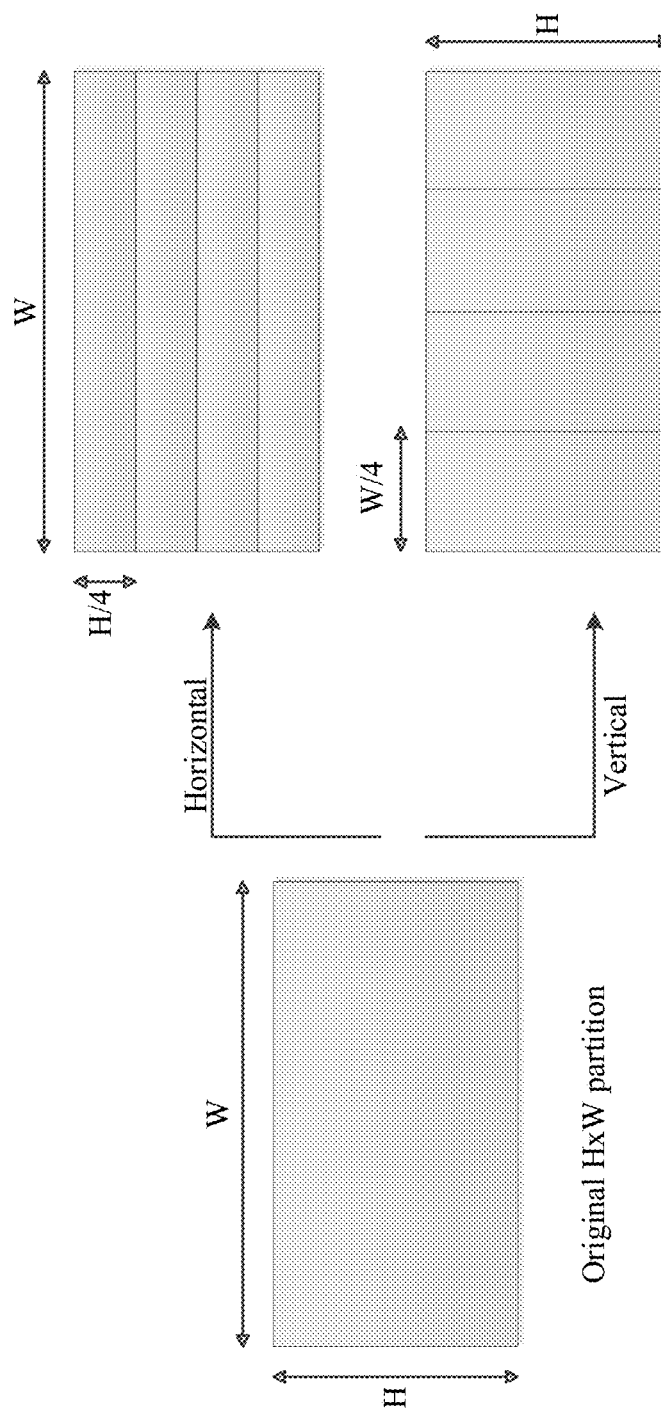
FIG. 7 shows an example of division of all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 2. FIG. 6 and FIG. 7 show examples of the two possibilities. All sub-partitions fulfill the condition of having at least 16 samples.

TABLE 1

Number of sub-partitions depending on the block size.

| Block Size | Number of Sub-Partitions |
| --- | --- |
| 4 × 4 | Not divided |
| 4 × 8 and 8 × 4 | 2 |
| All other cases | 4 |

FIG. 6 shows an example of division of 4×8 and 8×4 blocks.

FIG. 7 shows an example of division of all blocks except 4×8, 8×4 and 4×4.

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.7 Quantized Residual Domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded. For a block of size M (rows)×N (cols), let $r_{i,j}$, $0 \le i \le M-1$, $0 \le j \le N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, \quad 0 \le j \le (N-1) \\ Q(r_{i,j}) - Q(r_{(i-1),j}), & 1 \le i \le (M-1), \; 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), \ j = 0 \\ Q(r_{i,j}) - Q(r_{i,(j-1)}), & 0 \le i \le (M-1), \ 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $Q(r_{i,j}) = \Sigma_{k=0}^{i} \tilde{r}_{k,j}, 0 \le i \le (M-1), 0 \le j \le (N-1)$.

For horizontal case, $Q(r_{i,j}) = \Sigma_{k=0}^{j} \tilde{r}_{i,k}, 0 \le i \le (M-1), 0 \le j \le (N-1)$.

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

Transform skip is always used in quantized residual domain BDPCM.

2.8 Cross-Component Linear Model Prediction (CCLM)

Figure 8:
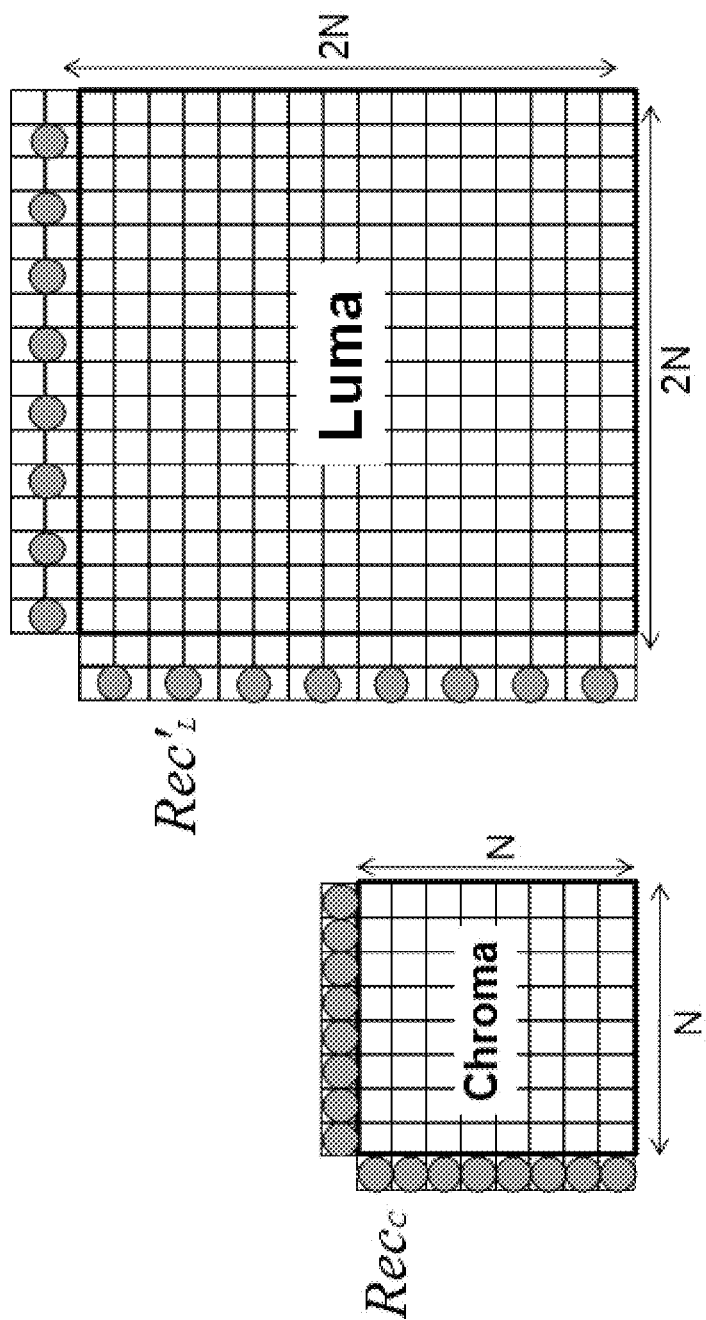
FIG. 8 shows examples of locations of the samples used for the derivation of $\alpha$ and $\beta$.

To reduce the cross-component redundancy, a cross-component linear model (CCLM) prediction mode is used in the VTM4, for which the chroma samples are predicted based on the reconstructed luma samples of the same CU by using a linear model as follows:

$pred_C(i,j) = \alpha \cdot rec_L'(i,j) + \beta$ where $pred_C(i,j)$ represents the predicted chroma samples in a CU and $rec_L(i,j)$ represents the downsampled reconstructed luma samples of the same CU. Linear model parameter $\alpha$ and $\beta$ are derived from the relation between luma values and chroma values from two samples, which are luma sample with minimum sample value and with maximum sample inside the set of downsampled neighboring luma samples, and their corresponding chroma samples. The linear model parameters $\alpha$ and $\beta$ are obtained according to the following equations.

$$\alpha = \frac{Y_a - Y_b}{X_a - X_b}$$

$$\beta = Y_b - \alpha \cdot X_b$$

Where $Y_a$ and $X_a$ represent luma value and chroma value of the luma sample with maximum luam sample value. And $X_b$ and $Y_b$ represent luma value and chroma value of the luma sample with minimum luma sample, respectively. FIG. 8 shows an example of the location of the left and above samples and the sample of the current block involved in the CCLM mode.

FIG. 8 shows examples of locations of the samples used for the derivation of $\alpha$ and $\beta$. The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

DivTable[ ] = {0, 7, 6, 5, 5, 4, 4, 3, 3, 2, 2, 1, 1, 1, 1, 0}

This would have a benefit of both reducing the complexity of the calculation as well as the memory size required for storing the needed tables Besides the above template and left template can be used to calculate the linear model coefficients together, they also can be used alternatively in the other 2 LM modes, called LM_A, and LM_L modes.

In LM_A mode, only the above template are used to calculate the linear model coefficients.

To get more samples, the above template are extended to (W+H). In LM_L mode, only left template are used to calculate the linear model coefficients. To get more samples, the left template are extended to (H+W).

For a non-square block, the above template are extended to W+W, the left template are extended to H+H.

To match the chroma sample locations for 4:2:0 video sequences, two types of downsampling filter are applied to luma samples to achieve 2 to 1 downsampling ratio in both horizontal and vertical directions. The selection of downsampling filter is specified by a SPS level flag. The two downsampling filters are as follows, which are corresponding to "type-0" and "type-2" content, respectively.

$$rec_L'(i, j) = \begin{bmatrix} rec_L(2i-1, 2j-1) + 2 \cdot rec_L(2i-1, 2j-1) + rec_L(2i+1, 2j-1) + \\ rec_L(2i-1, 2j) + 2 \cdot rec_L(2i, 2j) + rec_L(2i+1, 2j) + 4 \end{bmatrix} >> 3$$

$$rec_L'(i, j) = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{bmatrix} >> 3$$

Note that only one luma line (general line buffer in intra prediction) is used to make the downsampled luma samples when the upper reference line is at the CTU boundary.

According to current VVC design, PDPC is further applied to the prediction block generated in the CCLM mode based on luma samples.

This parameter computation is performed as part of the decoding process and is not just as an encoder search operation. As a result, no syntax is used to convey the $\alpha$ and $\beta$ values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

2.9 Chroma Intra Prediction Modes

For chroma intra mode coding, a total of 8 or 5 intra modes are allowed for chroma intra mode coding depending on whether cross-component linear model (CCLM) is enabled or not. Those modes include five traditional intra modes and three cross-component linear model modes (with IntraPredModeC set to 81, 82 and 83, respectively).

2.9.1 DM Mode

In chroma Direct Mode or Derived Mode (DM), prediction mode of co-located luma block is used for deriving the chroma intra prediction mode.

Firstly, an intra prediction mode lumaIntraPredMode is derived:
  If the co-located luma block is coded in MIP mode, lumaIntraPredMode is set equal to Planar mode.
  Otherwise, if the co-located luma block is coded in IBC mode or palette mode, lumaIntraPredMode is set equal to DC mode.
  Otherwise, lumaIntraPredMode is set equal to the intra prediction mode of the co-located luma block covering the corresponding luma sample of the center of chroma block. An example is depicted in FIG. 9.

Secondly, the intra chroma prediction mode (denoted as IntraPredModeC) is derived according to lumaIntraPredMode as highlighted in bold and Italic in the following table. Note that intra_chroma_pred_mode equal to 4 refers to the DM mode.

Note that in VVC, due to the dual tree, one chroma block may correspond to a luma region which covers multiple CUs. For example, in FIG. 9, the grey area of the chroma block is corresponding to the luma region which covers 5 CUs. When deriving DM mode, only one of the five CUs is checked, which is the "CR" as depicted in FIG. 9.

Figure 9:
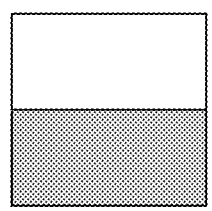
FIG. 9 shows an example of a 'CR' Position for DM derivation from the corresponding luma region.
Figure 9:
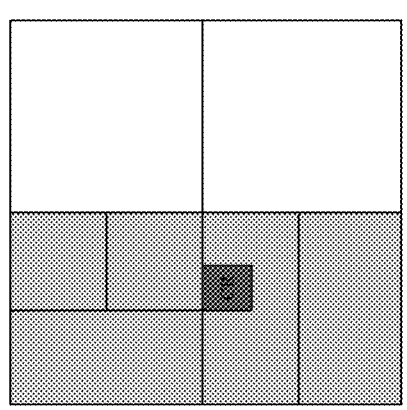

FIG. 9 shows an example of a 'CR' Position for DM derivation from the corresponding luma region.

2. PDPC is enabled for CCLM mode, however, how to select the neighboring samples and the weights applied to neighboring samples and chroma prediction signal generated from luma block with the linear model is undefined.
3. PDPC is enabled when "predModeIntra is less than or equal to INTRA_ANGULAR50". For the top-right wide-angular modes, PDPC will be disabled. Therefore, PDPC is disabled for certain wide-angular modes, which may be unreasonable.

4. A Listing of Techniques and Embodiments

The list below should be considered as examples to explain general concepts. These items should not be interpreted in a narrow way. Furthermore, these items can be combined in any manner.

Suppose width and height of the block (CU/PU/TU/CB/PB/TB etc.) are W and H respectively, predSamples(x, y) represents the predicted sample value at location (x, y), x=0 . . . W−1, y=0 . . . H−1. (x, y) is the coordinate of the sample relative to the top-left sample of the block, and x and y are the horizontal and vertical position of the sample

TABLE 8-2

Specification of IntraPredModeC[ xCb ][ yCb ] depending on cclm_mode_flag, cclm_mode_idx, intra_chroma_pred_mode and lumaIntraPredMode

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | *4* | *0* | *50* | *18* | *1* | *X* |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

Finally, if the color format of the picture is 4:2:2, IntraPredModeC is further modified according to the following table for the DM mode.

Specification of the 4:2:2 Mapping Process from Chroma Intra Prediction Mode X to Mode Y when Chroma_Format_Idc is Equal to 2.

respectively. R(x, y) represents the neighboring samples (e.g., reconstructed neighboring samples, or reconstructed neighboring samples modified by certain filtering process), with x=−1, y=−1 . . . refH−1 and x=0 . . . refW−1, y=−1, wherein refH and refW are the height and width of the reference neighboring samples. Let maxTbSize be the maxi-

| mode X | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| mode Y | 0 | 1 | 61 | 62 | 63 | 64 | 65 | 66 | 2 | 3 | 4 | 6 | 8 | 10 | 12 | 13 | 14 |

| mode X | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|
| mode Y | 16 | 18 | 20 | 22 | 23 | 24 | 26 | 28 | 30 | 32 | 33 | 34 | 35 | 36 | 37 | 38 | 39 |

| mode X | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|
| mode Y | 40 | 41 | 42 | 43 | 44 | 44 | 44 | 45 | 46 | 46 | 46 | 47 | 48 | 48 | 48 | 49 | 50 |

| mode X | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|
| mode Y | 51 | 52 | 52 | 52 | 53 | 54 | 54 | 54 | 55 | 56 | 56 | 56 | 57 | 58 | 59 | 60 |

3. Examples of Technical Problems Solved by Embodiments

The PDPC has the following problems:
1. In Planar mode or DC mode, the weighting factors (e.g., wL, wT and wLT) for neighboring samples depend on the prediction angle which is undefined in Planar and DC mode.

mum transform block size, e.g., 32 or 64, and wL[x], wT[y] are the weighting factors of the left neighboring samples and the above neighboring samples respectively. Let function Log 2(N) be the base-2 logarithm of N.

1. It is proposed that in Planar mode or/and DC mode, the weighting factors of neighboring samples in PDPC may only depend on the dimension(s) (e.g., width denoted as W or/and height denoted as H) of the block or/and the position of the sample to be filtered.
  a. In one example, for sample at position (x, y), weighting factor of the above neighboring sample (e.g., $R_{(x, -1)}$) may be defined as wT[y]=N1>>((y<<N2)>>nScale), wherein nScale=((Log 2(W)+Log 2(H)−N3)>>N4) and N1, N2, N3 and N4 are non-negative integers.
  b. In one example, for sample at position (x, y), weighting factor of the left neighboring sample (e.g., $R_{(-1, y)}$) may be defined as wL[x]=N1>>((x<<N2)>>nScale), wherein nScale=((Log 2(W)+Log 2(H)−N3)>>N4).
  c. In one example, for sample at position (x, y), weighting factor of the top-left neighboring sample (e.g., $R_{(-1, -1)}$) may be set equal to zero.
  d. N1, N2, N3 and N4 are non-negative integers. For example, N1=32, N2=1, N3=2, and N4=2.
2. Whether and/how to apply PDPC may depend on whether the current block is coded in CCLM modes (such as LM, LM-T, LM-L).
  a. PDPC may not be applied in CCLM modes.
  b. Alternatively, PDPC may be applied together with CCLM modes wherein the prediction signal generated from luma blocks, and chroma neighboring samples are utilized to derive the final prediction chroma block. The selection of neighboring chroma samples and/or weighting factors may be defined as follows:
    i. In one example, the way to select the neighboring chroma samples and/or to determine the weighting factors of the neighboring chroma samples may be the same as that in a predefined mode (e.g., Planar mode).
    ii. Alternatively, when the corresponding luma block is coded in intra prediction mode like angular prediction modes (e.g., further including wide-angular prediction modes, or vertical mode or horizontal mode) or Planar mode or DC mode, such intra prediction mode may be used for selecting the neighboring chroma samples and determining the weighting factors of the neighboring chroma samples.
      1. In one example, the corresponding luma block is one of the coding units/prediction units/transform units that the corresponding luma region (e.g., the grey area in FIG. 9) covers.
        a. In one example, the corresponding luma block is the coding units/prediction units/transform units covers the corresponding luma sample of the center chroma sample (such as CR in FIG. 9).
    iii. Alternatively, when the corresponding luma block is coded in intra prediction mode like angular prediction modes (e.g., further including wide-angular prediction modes, or vertical mode or horizontal mode) or Planar mode or DC mode, such intra prediction mode may be used for selecting the neighboring chroma samples and determining the weighting factors of the neighboring chroma samples.
  c. Alternatively, PDPC may be applied to CCLM coded blocks with the prediction signal generated from luma blocks, and derived chroma neighboring samples instead of using reconstructed chroma neighboring samples.
    i. In one example, the neighboring chroma samples may be derived from the neighboring luma samples of the corresponding luma block by using the linear model derived in the CCLM process.
  d. Alternatively, the corresponding reconstructed luma samples in the corresponding luma block may be filtered by PDPC before being used for predicting the chroma samples.
    i. In one example, when filtering the reconstructed luma samples, the way to select the neighboring samples and/or to determine the weighting factors of the neighboring luma samples may be the same as that in a predefined mode (e.g., Planar mode).
    ii. Alternatively, the way to select the neighboring samples and/or to determine the weighting factors of the neighboring luma samples may depend on the intra prediction mode of the luma block.
      1. In one example, when the luma block is coded in intra prediction mode like angular prediction modes (including wide-angular prediction modes, or vertical mode or horizontal mode) or Planar mode or DC mode, such intra prediction mode may be used for selecting the neighboring luma samples and determining the weighting factors of the neighboring luma samples.
3. Whether and/how to apply PDPC may depend on whether the current block is coded in wide-angler intra-prediction modes.
  a. PDPC may be applied for blocks with wide-angular intra prediction modes.
    i. In one example, PDPC may be applied for blocks with some specific (not all) wide-angular intra prediction modes.
  b. PDPC may not be applied for blocks with wide-angular intra prediction modes.
4. Whether PDPC can be applied to a block may depend on whether both the above neighboring samples and the left neighboring samples (e.g., $R_{(+1, y)}$ and $R_{(x, -1)}$ in equation (2-1)) are "involved" along the intra prediction direction. For example, in the intra prediction process, suppose a sample is predicted from a left/above neighboring sample (may be located at fractional position). A half-line is drawn along the intra prediction direction with the starting point being the left/above neighboring sample, if the half-line across the above/left neighboring row/column, then, both the above neighboring samples and the left neighboring samples are said to be "involved" along the intra prediction direction for the sample. Note that $R_{(-1, -1)}$ may be always considered as a left neighboring sample or a above neighboring sample but not both.
  a. In one example, the intra prediction direction may be defined as an angular intra prediction mode.
    i. In one example, the intra prediction direction may exclude the vertical or/and horizontal prediction direction).
    ii. In one example, the intra prediction direction may exclude the DC and/or Planar mode.
    iii. In one example, the intra prediction direction may exclude the wide-angular intra prediction mode.
  b. In one example, if both the above neighboring samples and the left neighboring samples are "involved" along the intra prediction direction for predicting at least N samples (e.g., N=1) of the block, PDPC may be applied. An example is shown in FIGS. 10 (a) and (b) wherein PDPC is enabled.

i. Alternatively, furthermore, if the two neighboring samples are not "involved" in the intra prediction process for predicting any samples of the block, PDPC may not be applied, an example is shown in FIGS. 10 (c) and (d).

Figure 10:
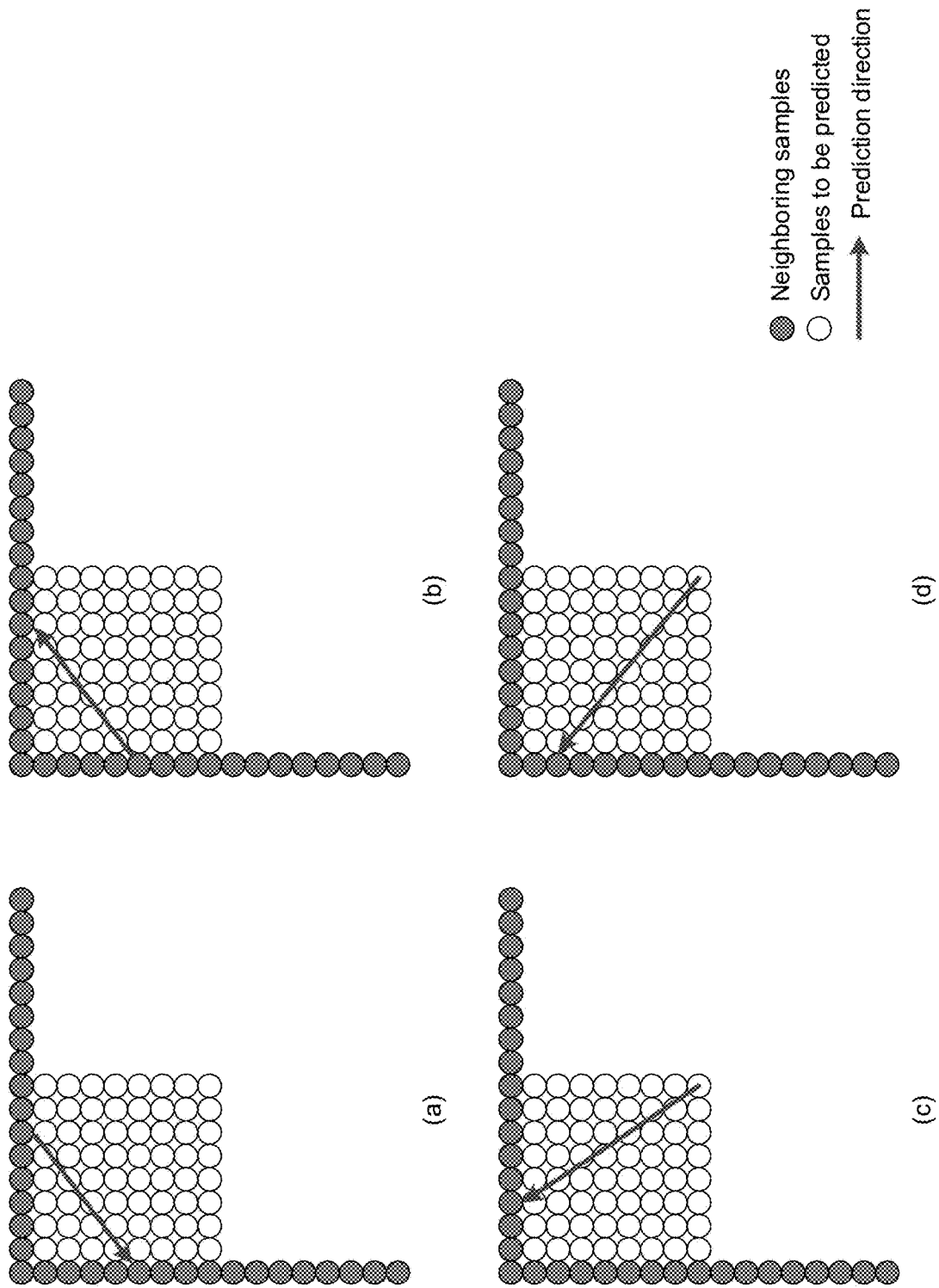
FIG. 10 shows examples of neighboring samples involved along the prediction direction.

FIG. 10 shows examples of neighboring samples involved along the prediction direction.

5. Whether to enable or disable PDPC may depend on color component.
   a. In one example, PDPC may be enabled for luma color component (e.g., Y in YCbCr color format; G in RGB color format) but may be disabled for at least one chroma color component (e.g., Cb and/or Cr in YCbCr color format; B and/or R in RGB color format).
6. Multiple ways of PDPC may be allowed, based on the filtering process involves how many samples to derive one final prediction sample.
   a. In one example, one final prediction sample may be derived according to one or multiple left neighboring samples (filtered or unfiltered) and the internal prediction values (e.g., pred(x,y) in equation 2-1) obtained e.g., from normal intra prediction process.
   b. In one example, one final prediction sample may be derived according to one or multiple above neighboring samples (filtered or unfiltered) and the internal prediction values (e.g., pred(x,y) in equation 2-1) obtained e.g., from normal intra prediction process.
   c. Which way of PDPC shall be applied to a block may be dependent on coded information:
      i. Block dimension
      ii. Block shape
      iii. Ratio between block width and height
      iv. Index or flags signaled in a video unit
7. Whether PDPC can be applied to a block may depend on the block dimension and/or block shape (square or non-square).
   a. In one example, for non-square blocks, PDPC may be disabled.
   b. In one example, whether to enable or disable PDPC may depend on the ratio between block width and block height.
   c. PDPC may be disallowed when block size is small
      i. In one example, when the width of a block is smaller than or equal to a threshold T (e.g. T=2, 4), PDPC may be disallowed.
      ii. In one example, when the height of a block is smaller than or equal to a threshold T (e.g. T=2, 4), PDPC may be disallowed.
      iii. In one example, when the number of luma samples in a block is smaller than or equal to a threshold T (e.g., 16, 32, 64), PDPC may be disallowed.
   d. PDPC may be disallowed when block size is large.
      i. In one example, when the width of a block is greater than or equal to a threshold T (e.g. T=32), PDPC may be disallowed.
      ii. In one example, when the height of a block is greater than or equal to a threshold T (e.g. T=32), PDPC may be disallowed.
      iii. In one example, when the number of luma samples in a block is greater than or equal to a threshold T (e.g., 1024), PDPC may be disallowed.
   e. Whether to enable or disable the PDPC may be decided independently for different color components.

5. Embodiment

The newly added parts are highlighted in bold and Italic, and the deleted parts are marked with double brackets (e.g., [[a]] denotes the deletion of the character "a").

5.1 One Example

This is an example of bullet 1.

8.4.5.2.14 Position-Dependent Intra Prediction Sample Filtering Process

Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighbouring samples p[x][y], with x=−1, y=−1 . . . refH−1 and x=0 . . . refW−1, y=−1,
a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:
If cIdx is equal to 0, clip1Cmp is set equal to $Clip1_Y$.
Otherwise, clip1Cmp is set equal to $Clip1_C$.

The variable nScale is derived as follows:
If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
Otherwise, if predModeIntra is less than INTRA_ANGULAR18 and is not equal to INTRA_PLANAR and is not equal to INTRA_DC, nScale is set equal to Min(2, Log 2(nTbW)−Floor(Log 2(3*invAngle−2))+8), using invAngle as specified in clause 8.4.5.2.12.
Otherwise, nSacle is set to ((Log 2(nTbW)+Log 2(nTbH)−2)>>2).

The reference sample arrays mainRef[x] and sideRef[y], with x=0 . . . refW−1 and y=0 . . . refH−1 are derived as follows:

$$mainRef[x]=p[x][-1] \qquad (8\text{-}244)$$

$$sideRef[y]=p[-1][y] \qquad (8\text{-}245)$$

The variables refL[x][y], refT[x][y], wT[y], wL[x] and wTL[x][y] with x=0 . . . nTbW−1, y=0 . . . nTbH−1 are derived as follows:
If predModeIntra is equal to INTRA_PLANAR or INTRA_DC, the following applies:

$$refL[x][y]=p[-1][y] \qquad (8\text{-}245)$$

$$refT[x][y]=p[x][-1] \qquad (8\text{-}246)$$

$$wT[y]=32>>((y<<1)>>nScale) \qquad (8\text{-}247)$$

$$wL[x]=32>>((x<<1)>>nScale) \qquad (8\text{-}248)$$

$$wTL[x][y]=0 \qquad (8\text{-}249)$$

Otherwise, if predModeIntra is equal to INTRA_ANGULAR18 or INTRA_ANGULAR50, the following applies:

$$refL[x][y]=p[-1][y] \qquad (8\text{-}250)$$

$$refF[x][y]=p[x][-1] \qquad (8\text{-}251)$$

$wT[y]=(predModeIntra==INTRA\_ANGULAR18)$
$?32>>((y<<1)>>nScale):0$ (8-252)

$wL[x]=(predModeIntra==INTRA\_ANGULAR50)$
$?32>>((x<<1)>>nScale):0$ (8-253)

$wTL[x][y]=(predModeIntra==INTRA\_ANGULAR18)$
$?wT[y]:wL[x]$ (8-254)

Otherwise, if predModeIntra is less than INTRA_ANGULAR18 and nScale is equal to or greater than 0, the following ordered steps apply:

3. The variables dXInt[y] and dX[x][y] are derived as follows using invAngle as specified in clause 8.4.5.2.12 depending on intraPredMode:

$dX\text{Int}[y]=((y+1)*\text{invAngle}+256)>>9$ (8-255)

$dX[x][y]=x+dX\text{Int}[y]$

4. The variables refL[x][y], refT[x][y], wT[y], wL[x] and wTL[x][y] are derived as follows:

$refL[x][y]=0$ (8-256)

$refT[x][y]=(y<(3<<nScale))?\text{mainRef}[dX[x][y]]:0$ (8-257)

$wT[y]=32>>((y<<1)>>nScale)$ (8-258)

$wL[x]=0$ (8-259)

$wTL[x][y]=0$ (8-260)

Otherwise, if predModeIntra is greater than INTRA_ANGULAR50 and nScale is equal to or greater than 0, the following ordered steps apply:

3. The variables dYInt[x] and dY[x][y] are derived as follows using invAngle as specified in clause 8.4.5.2.12 depending on intraPredMode:

$dY\text{Int}[x]=((x+1)*\text{invAngle}+256)>>9$ (8-261)

$dY[x][y]=y+dY\text{Int}[x]$

4. The variables refL[x][y], refT[x][y], wT[y], wL[x] and wTL[x][y] are derived as follows:

$refL[x][y]=(y<(3<<nScale))?\text{sideRef}[dY[x][y]]:0$ (8-262)

$refT[x][y]=0$ (8-263)

$wT[y]=0$ (8-264)

$wL[x]=32>>((x<<1)>>nScale)$ (8-265)

$wTL[x][y]=0$ (8-266)

Otherwise, refL[x][y], refT[x][y], wT[y], wL[x] and wTL[x][y] are all set equal to 0.
The values of the modified predicted samples predSamples[x][y], with x=0 . . . nTbW−1, y=0 . . . nTbH−1 are derived as follows:

$predSamples[x][y]=\text{clip1Cmp}((refL[x][y]*wL[x]+refT[x][y]*wT[y]-p[-1][-1]*wTL[x][y]+(64-wL[x]-wT[y]+wTL[x][y])*predSamples[x][y]+32)>>6)$ (8-267)

Alternatively, the above lines may be replaced by:
The variable nScale is derived as follows:
If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
Otherwise, if predModeIntra is less than INTRA_ANGULAR18 and is greater than INTRA_DC, nScale is set equal to Min(2, Log 2(nTbW)−Floor(Log 2(3*invAngle−2))+8), using invAngle as specified in clause 8.4.5.2.12.
Otherwise, if predModeIntra is equal to INTRA_PLANAR or INTRA_DC or INTRA_ANGULAR18 or INTRA_ANGULAR50, nSacle is set to ((Log 2(nTbW)+Log 2(nTbH)−2)>>2).

5.2 One Example
This is an example of bullet 2 and 3.
8.4.5.2.5 General Intra Sample Prediction
Inputs to this process are:
  a sample location (xTbCmp, yTbCmp) specifying the top-left sample of the current transform block relative to the top-left sample of the current picture,
  a variable predModeIntra specifying the intra prediction mode,
  a variable nTbW specifying the transform block width,
  a variable nTbH specifying the transform block height,
  a variable nCbW specifying the coding block width,
  a variable nCbH specifying the coding block height,
  a variable cIdx specifying the colour component of the current block.
Outputs of this process are the predicted samples predSamples[x][y], with x=0 . . . nTbW−1, y=0 . . . nTbH−1.
The variables refW and refH are derived as follows:
  If IntraSubPartitionsSplitType is equal to ISP_NO_SPLIT or cIdx is not equal to 0, the following applies:

$refW=nTbW*2$ (8-118)

$refH=nTbH*2$ (8-119)

Otherwise (IntraSubPartitionsSplitType is not equal to ISP_NO_SPLIT and cIdx is equal to 0), the following applies:

$refW=nCbW+nTbW$ (8-120)

$refH=nCbH+nTbH$ (8-121)

The variable refIdx specifying the intra prediction reference line index is derived as follows:

$refIdx=(cIdx==0)?\text{IntraLumaRefLineIdx}[xTbCmp][yTbCmp]:0$ (8-122)

The wide angle intra prediction mode mapping process as specified in clause 8.4.5.2.6 is invoked with predModeIntra, nTbW, nTbH and cIdx as inputs, and the modified predModeIntra as output.
The variable refFilterFlag is derived as follows:
  If predModeIntra is equal to one of the following values: 0, −14, −12, −10, −6, 2, 34, 66, 72, 76, 78, 80, then refFilterFlag is set equal to 1.
  Otherwise, refFilterFlag is set equal to 0.
For the generation of the reference samples p[x][y] with x=−1−refIdx, y=−1−refIdx . . . refH−1 and x=−refIdx . . . refW−1, y=−1−refIdx, the following ordered steps apply:
4. The reference sample availability marking process as specified in clause 8.4.5.2.7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.
5. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x= −refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.

6. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt [x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

If predModeIntra is equal to INTRA_PLANAR, the corresponding intra prediction mode process specified in clause 8.4.5.2.10 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.5.2.11 is invoked with the transform block width nTbW, the transform block height nTbH, the intra prediction reference line index refIdx, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.5.2.13 is invoked with the intra prediction mode predModeIntra, the sample location (xTbC, yTbC) set equal to (xTbCmp, yTbCmp), the transform block width nTbW and height nTbH, the colour component index cIdx, and the reference sample array p as inputs, and the output is the predicted sample array predSamples.

Otherwise, the corresponding intra prediction mode process specified in clause 8.4.5.2.12 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the reference filter flag refFilterFlag, the colour component index cIdx, and the reference sample array p as inputs, and the predicted sample array predSamples as outputs.

When all of the following conditions are true, the position-dependent prediction sample filtering process specified in clause 8.4.5.2.14 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

nTbW is greater than or equal to 4 and nTbH is greater than or equal to 4 or cIdx is not equal to 0 refIdx is equal to 0 or cIdx is not equal to 0

BdpcmFlag[xTbCmp][xTbCmp] is equal to 0

One of the following conditions is true:
  predModeIntra is equal to INTRA_PLANAR
  predModeIntra is equal to INTRA_DC
  predModeIntra is less than or equal to INTRA_ANGULAR18
  predModeIntra is [[less]] greater than or equal to INTRA_ANGULAR50 and is less than INTRA_LT_CCLM.

5.4 One Example

This is an example of bullet 4.

8.4.5.2.5 General Intra Sample Prediction

Inputs to this process are:
  a sample location (xTbCmp, yTbCmp) specifying the top-left sample of the current transform block relative to the top-left sample of the current picture,
  a variable predModeIntra specifying the intra prediction mode,
  a variable nTbW specifying the transform block width,
  a variable nTbH specifying the transform block height,
  a variable nCbW specifying the coding block width,
  a variable nCbH specifying the coding block height,
  a variable cIdx specifying the colour component of the current block.

Outputs of this process are the predicted samples predSamples[x][y], with x=0 . . . nTbW−1, y=0 . . . nTbH−1.

The variables refW and refH are derived as follows:
  If IntraSubPartitionsSplitType is equal to ISP_NO_SPLIT or cIdx is not equal to 0, the following applies:

$$refW = nTbW*2 \tag{8-118}$$

$$refH = nTbH*2 \tag{8-119}$$

Otherwise (IntraSubPartitionsSplitType is not equal to ISP_NO_SPLIT and cIdx is equal to 0), the following applies:

$$refW = nCbW + nTbW \tag{8-120}$$

$$refH = nCbH + nTbH \tag{8-121}$$

The variable refIdx specifying the intra prediction reference line index is derived as follows:

$$refIdx = (cIdx == 0)?IntraLumaRefLineIdx[xTbCmp][yTbCmp]:0 \tag{8-122}$$

The wide angle intra prediction mode mapping process as specified in clause 8.4.5.2.6 is invoked with predModeIntra, nTbW, nTbH and cIdx as inputs, and the modified predModeIntra as output.

The variable refFilterFlag is derived as follows:
  If predModeIntra is equal to one of the following values: 0, −14, −12, −10, −6, 2, 34, 66, 72, 76, 78, 80, then refFilterFlag is set equal to 1.
  Otherwise, refFilterFlag is set equal to 0.

For the generation of the reference samples p[x][y] with x=−1−refIdx, y=−1−refIdx . . . refH−1 and x=−refIdx . . . refW−1, y=−1−refIdx, the following ordered steps apply:

7. The reference sample availability marking process as specified in clause 8.4.5.2.7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−refIdx . . . refH−1 and x=−refIdx . . . refW−1, y=−refIdx as output.

8. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.

9. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−refIdx . . . refH−1 and x=−refIdx . . . refW−1, y=−refIdx as output.

The intra sample prediction process according to predModeIntra applies as follows:

If predModeIntra is equal to INTRA_PLANAR, the corresponding intra prediction mode process specified in clause 8.4.5.2.10 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.5.2.11 is invoked with the transform block width nTbW, the transform block height nTbH, the intra prediction reference line index refIdx, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.5.2.13 is invoked with the intra prediction mode predModeIntra, the sample location (xTbC, yTbC) set equal to (xTbCmp, yTbCmp), the transform block width nTbW and height nTbH, the colour component index cIdx, and the reference sample array p as inputs, and the output is the predicted sample array predSamples.

Otherwise, the corresponding intra prediction mode process specified in clause 8.4.5.2.12 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the reference filter flag refFilterFlag, the colour component index cIdx, and the reference sample array p as inputs, and the predicted sample array predSamples as outputs.

When all of the following conditions are true, the position-dependent prediction sample filtering process specified in clause 8.4.5.2.14 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

nTbW is greater than or equal to 4 and nTbH is greater than or equal to 4 or cIdx is not equal to 0 refIdx is equal to 0 or cIdx is not equal to 0

BdpcmFlag[xTbCmp][xTbCmp] is equal to 0 predModeIntra is less than INTRA_LT_CCLM

[[One of the following conditions is true:

predModeIntra is equal to INTRA_PLANAR predModeIntra is equal to INTRA_DC predModeIntra is less than or equal to INTRA_ANGULAR18 predModeIntra is less than or equal to INTRA_ANGULAR50]]

8.4.5.2.14 Position-Dependent Intra Prediction Sample Filtering Process

Inputs to this process are:

the intra prediction mode predModeIntra, a variable nTbW specifying the transform block width, a variable nTbH specifying the transform block height, a variable refW specifying the reference samples width, a variable refH specifying the reference samples height, the predicted samples predSamples[x][y], with x=0 . . . nTbW−1, y=0 . . . nTbH−1, the neighbouring samples p[x][y], with x=−1, y=−1 . . . refH−1 and x=0 . . . refW−1, y=−1, a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:

If cIdx is equal to 0, clip1Cmp is set equal to $Clip1_Y$.

Otherwise, clip1Cmp is set equal to $Clip1_C$.

The variable nScale is derived as follows:

If predModeIntra is equal to one of the following values, nScale is set to ((Log 2(nTbW)+Log 2(nTbH)−2)>>2).

INTRA_PLANAR

INTRA_DC

INTRA_ANGULAR18

INTRA_ANGULAR50

Otherwise, i[[I]]f predModeIntra is greater than or equal to INTRA_ANGULAR34 [[INTRA_ANGULAR50]], nScale is set equal to Min(2, Log 2(nTbH)−Floor(Log 2(3*invAngle−2))+8), using invAngle as specified in clause 8.4.5.2.12.

Otherwise, [[if predModeIntra is greater than less than INTRA_ANGULAR18,]] nScale is set equal to Min(2, Log 2(nTbW)−Floor(Log 2(3*invAngle−2))+8), using invAngle as specified in clause 8.4.5.2.12.

[[Otherwise, nSacle is set to ((Log 2(nTbW)+Log 2(nTbH)−2)>>2).]]

If nScale is less than zero, this process is terminated.

The reference sample arrays mainRef[x] and sideRef[y], with x=0 . . . refW−1 and y=0 . . . refH−1 are derived as follows:

$$mainRef[x]=p[x][-1] \quad (8\text{-}244)$$

$$sideRef[y]=p[-1][y]$$

The variables refL[x][y], refT[x][y], wT[y], wL[x] and wTL[x][y] with x=0 . . . nTbW−1, y=0 . . . nTbH−1 are derived as follows:

If predModeIntra is equal to INTRA_PLANAR or INTRA_DC, the following applies:

$$refL[x][y]=p[-1][y] \tag{8-245}$$

$$refT[x][y]=p[x][-1] \tag{8-246}$$

$$wT[y]=32>>((y<<1)>>nScale) \tag{8-247}$$

$$wL[x]=32>>((x<<1)>>nScale) \tag{8-248}$$

$$wTL[x][y]=0 \tag{8-249}$$

Otherwise, if predModeIntra is equal to INTRA_ANGULAR18 or INTRA_ANGULAR50, the following applies:

$$refL[x][y]=p[-1][y] \tag{8-250}$$

$$refT[x][y]=p[x][-1] \tag{8-251}$$

$$wT[y]=(predModeIntra==INTRA\_ANGULAR18)\\?32>>((y<<1)>>nScale):0 \tag{8-252}$$

$$wL[x]=(predModeIntra==INTRA\_ANGULAR50)\\?32>>((x<<1)>>nScale):0 \tag{8-253}$$

$$wTL[x][y]=(predModeIntra==INTRA\_ANGULAR18)\\?wT[y]:wL[x] \tag{8-254}$$

Otherwise, if predModeIntra is less than INTRA_ANGULAR18 and nScale is equal to or greater than 0, the following ordered steps apply:

5. The variables dXInt[y] and dX[x][y] are derived as follows using invAngle as specified in clause 8.4.5.2.12 depending on intraPredMode:

$$dXInt[y]=((y+1)*invAngle+256)>>9 \tag{8-255}$$

$$dX[x][y]=x+dXInt[y]$$

6. The variables refL[x][y], refT[x][y], wT[y], wL[x] and wTL[x][y] are derived as follows:

$$refL[x][y]=0 \tag{8-256}$$

$$refT[x][y]=(y<(3<<nScale))?mainRef[dX[x][y]]:0 \tag{8-257}$$

$$wT[y]=32>>((y<<1)>>nScale) \tag{8-258}$$

$$wL[x]=0 \tag{8-259}$$

$$wTL[x][y]=0 \tag{8-260}$$

Otherwise, if predModeIntra is greater than INTRA_ANGULAR50 and nScale is equal to or greater than 0, the following ordered steps apply:

5. The variables dYInt[x] and dY[x][y] are derived as follows using invAngle as specified in clause 8.4.5.2.12 depending on intraPredMode:

$$dYInt[x]=((x+1)*invAngle+256)>>9 \tag{8-261}$$

$$dY[x][y]=y+dYInt[x]$$

6. The variables refL[x][y], refT[x][y], wT[y], wL[x] and wTL[x][y] are derived as follows:

$$refL[x][y]=(y<(3<<nScale))?sideRef[dY[x][y]]:0 \tag{8-262}$$

$$refT[x][y]=0 \tag{8-263}$$

$$wT[y]=0 \tag{8-264}$$

$$wL[x]=32>>((x<<1)>>nScale) \tag{8-265}$$

$$wTL[x][y]=0 \tag{8-266}$$

Otherwise, refL[x][y], refT[x][y], wT[y], wL[x] and wTL[x][y] are all set equal to 0.

The values of the modified predicted samples predSamples[x][y], with x=0 . . . nTbW−1, y=0 . . . nTbH−1 are derived as follows:

$$predSamples[x][y]=clip1Cmp((refL[x][y]*wL[x]+refT\\ [x][y]*wT[y]-p[-1][-1]*wTL[x][y]+(64-wL[x]-\\ wT[y]+wTL[x][y])*predSamples[x][y]+32)>>6) \tag{8-267}$$

Figure 11A:
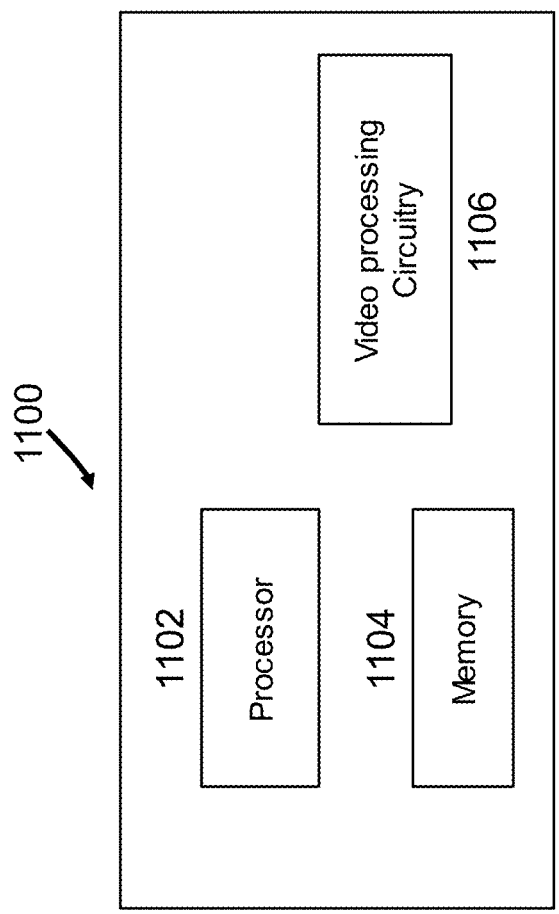
FIGS. 11A and 11B are block diagrams of examples of a hardware platform used for implementing techniques described in the present document.

FIG. 11A is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document. In some embodiments, the hardware 1106 may be at least partly within the processers 1102, e.g., a graphics co-processor.

Figure 11B:
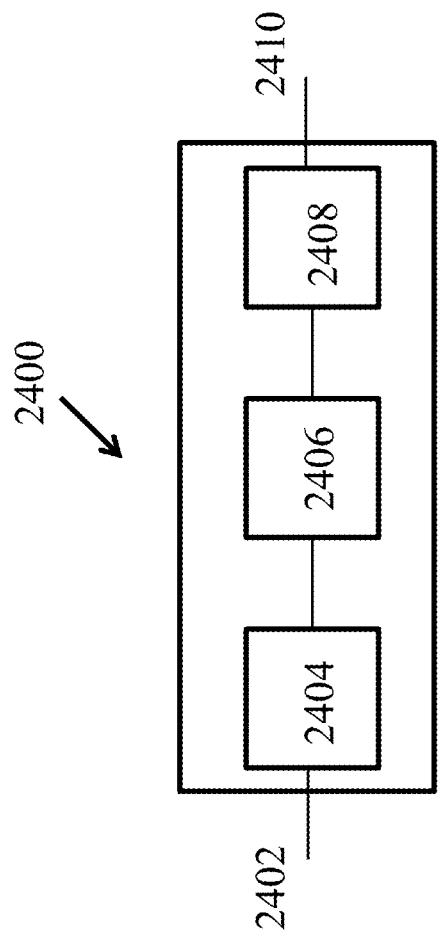

FIG. 11B is another example of a block diagram of a video processing system in which disclosed techniques may be implemented. FIG. 11B is a block diagram showing an example video processing system 2400 in which various techniques disclosed herein may be implemented. Various implementations may include some or all of the components of the system 2400. The system 2400 may include input 2402 for receiving video content. The video content may be received in a raw or uncompressed format, e.g., 8 or 10 bit multi-component pixel values, or may be in a compressed or encoded format. The input 2402 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2400 may include a coding component 2404 that may implement the various coding or encoding methods described in the present document. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by the component 2408 for generating pixel values or displayable video that is sent to a display interface 2410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video processing methods discussed in this patent document may be implemented using an apparatus that is implemented on a hardware platform as described with respect to FIG. 11A or 11B.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

Various techniques and embodiments may be described using the following clause-based format. The first set of clauses describe certain features and aspects of the disclosed techniques in the previous section.

The following clauses may be implemented together with additional techniques described in items listed in the previous section (e.g., item 1).

Figure 12:
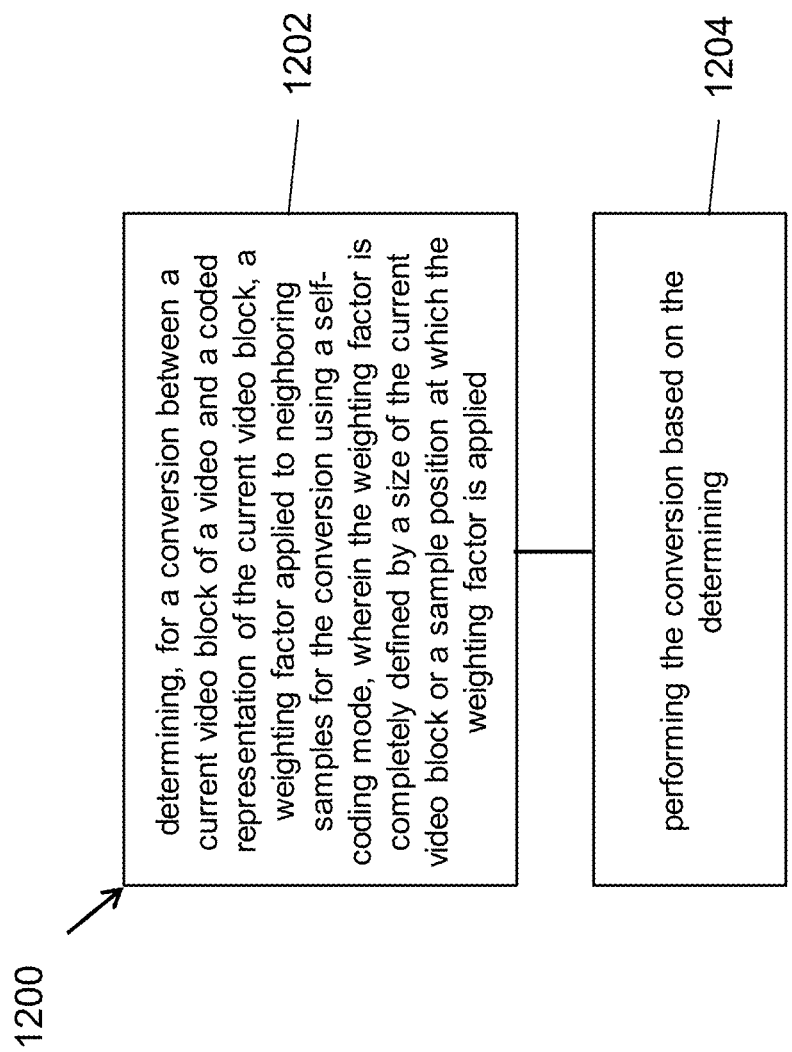
FIGS. 12 and 13 are flowcharts for example methods of video processing.

1. A method of video processing (e.g., method 1200 shown in FIG. 12), comprising: determining (1202), for a conversion between a current video block of a video and a coded representation of the current video block, a weighting factor applied to neighboring samples for the conversion using a self-coding mode, wherein the weighting factor is completely defined by a size of the current video block or a sample position at which the weighting factor is applied, and performing (1204) the conversion based on the determining, wherein the self-coding mode comprises a planar coding mode of a direct current (DC) coding mode.

2. The method of clause 1, wherein the sample position is (x, y) and wherein the weighting factor for the neighboring samples that are above neighboring samples is $wT[y]=N1>>((y<<N2)>>nScale)$, wherein $nScale=((Log\ 2(W)+Log\ 2(H)-N3)>>N4)$ where N1, N2, N3 and N4 are non-negative integers.

3. The method of clause 1, wherein the sample position is (x, y) and wherein the weighting factor for the neighboring samples that are left neighboring samples is $wL[x]=N1>>((x<<N2)>>nScale)$, wherein $nScale=((Log\ 2(W)+Log\ 2(H)-N3)>>N4)$, where N1, N2, N3 and N4 are non-negative integers.

4. The method of clause 1, wherein the sample position is (x, y) and the weighting factor of the neighboring samples in a top-left position is zero.

5. The method of any of clauses 1-4, wherein, N1=32, N2=1, N3=2, or N4=2.

The following solutions may be implemented together with additional techniques described in items listed in the previous section (e.g., items 2, 3, 4 and 7).

6. A method of video processing, comprising: determining, during a conversion between a current video block of a video and a coded representation of the current video block, whether a self-coding mode is applied to the current video block based on a rule that uses a coding mode used for the conversion current video block; and performing the conversion based on the determining.

7. The method of clause 6, wherein the coding mode includes a cross-component linear model (CCLM).

8. The method of clause 7, wherein the rule specifies to disable the self-coding mode in case that the CCLM is used.

9. The method of clause 7, wherein the rule specifies to enable the self-coding mode in case that the CCLM is used.

10. The method of clause 9, wherein a second rule further specifies locations of reference samples to be used during the self-coding based conversion.

11. The method of clause 10, wherein the second rule specifies to use locations same as locations of reference samples used in a planar coding mode.

12. The method of clause 10, wherein the second rule specifies that the self-coding uses predicted luma samples or derived chroma neighboring samples during the conversion of the current video block.

13. The method of clause 6, wherein the coding mode includes a wide-angular intra prediction mode.

14. The method of clause 6, wherein the rule specifies to disable the self-coding mode in case that the wide-angular intra prediction mode is used.

15. The method of clause 6, wherein the rule specifies to enable the self-coding due to the wide-angular intra prediction mode being used.

16. The method of clause 6, wherein the coding mode is defined by whether above or left samples are involved during intra prediction of the current video block.

17. The method of clause 16, wherein the intra prediction comprises an angular intra prediction mode.

18. The method of clause 6, wherein the coding mode corresponds to a height or a width of the current video block or a shape of the current video block.

19. The method of clause 18, wherein the rule specifies that the self-coding mode is disabled due to the current video block having a non-square shape.

The following clauses may be implemented together with additional techniques described in items listed in the previous section (e.g., item 5).

20. A method of video processing, comprising: determining, during a conversion between a current video block of a video and a coded representation of the current video block, whether a self-coding mode is applied to the current video block based on a rule that uses a component of the current video block; and performing the conversion based on the determining.

21. The method of clause 20, wherein the rule defines to enable the self-coding mode due to the current video block being a luma block.

22. The method of clause 20, wherein the rule defines to disable the self-coding mode due to the current video block being a chroma block.

The following solutions may be implemented together with additional techniques described in items listed in the previous section (e.g., item 6).

23. A method of video processing, comprising: determining, during a conversion between a current video block of a video and a coded representation of the current video block, to apply multiple self-coding modes to the current video block based on a rule; and performing the conversion using a result of applying the multiple self-coding modes.

24. The method of clause 23, wherein the multiple self-coding modes include a coding mode based on filtered or unfiltered left neighboring samples.

25. The method of clause 23, wherein the multiple self-coding modes include a coding mode based on filtered or unfiltered above neighboring samples.

26. The method of any of clauses 23-25, wherein the rule is based on a coded information including a dimension of the current video block or a shape of the current video block or a ratio of a height and a width of the current video block or a flag signaled in the coded representation.

27. The method of any of above clauses, wherein the self-coding mode includes a position dependent intra prediction combination (PDPC) mode.

28. The method of any of clauses 1 to 27, wherein the conversion comprises encoding the video into the coded representation.

29. The method of any of clauses 1 to 27, wherein the conversion comprises decoding the coded representation to generate pixel values of the video.

30. A video decoding apparatus comprising a processor configured to implement a method recited in one or more of clauses 1 to 27.

31. A video encoding apparatus comprising a processor configured to implement a method recited in one or more of clauses 1 to 27.

32. A computer program product having computer code stored thereon, the code, when executed by a processor, causes the processor to implement a method recited in any of clauses 1 to 27.

33. A method, apparatus or system described in the present document.

The second set of clauses describe certain features and aspects of the disclosed techniques in the previous section, for example, Example Implementation 1.

Figure 13:
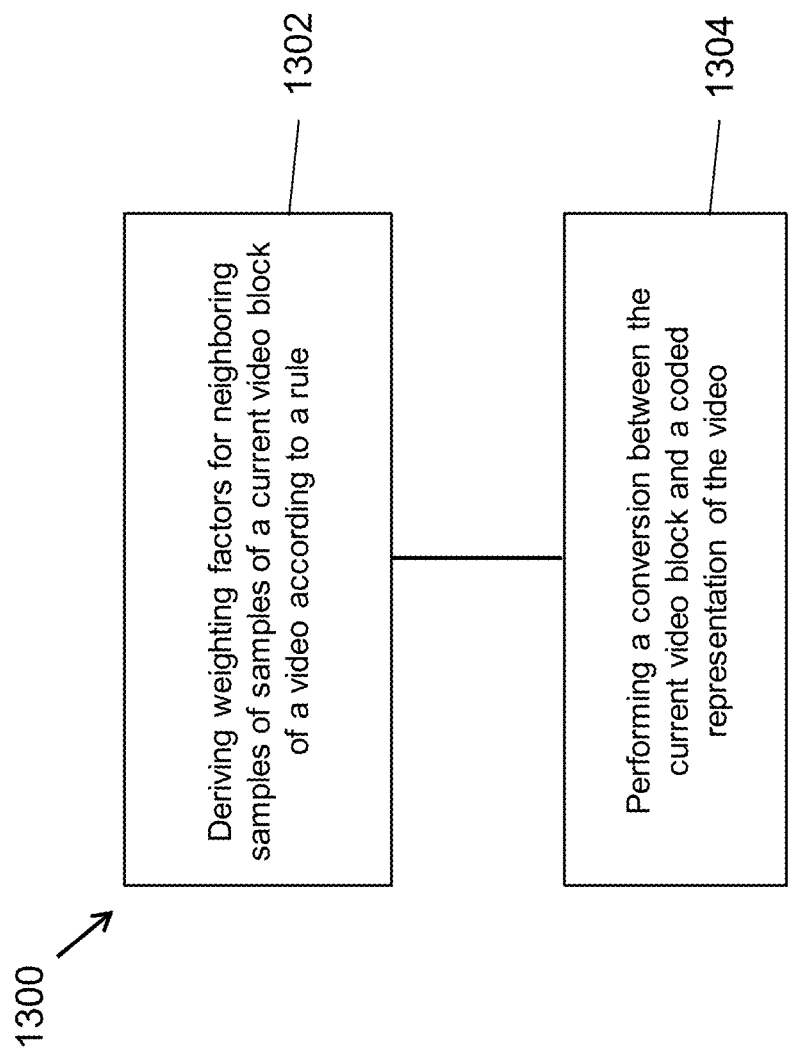

1. A method of video processing (e.g., method 1300 shown in FIG. 13), comprising: deriving (1302) weighting factors for neighboring samples of samples of a current video block of a video according to a rule; and performing (1304) a conversion between the current video block and a coded representation of the video, and wherein the rule specifies that, in case that the current video block is coded using a planar mode or a DC mode, the weighting factors are determined from at least one of a dimension of the current video block or positions of the samples of the current video block, wherein the current video block uses a position dependent intra prediction (PDPC) method that combines the neighboring samples with a prediction signal of the current video block to generate a refined prediction signal of the current video block, and wherein a weighting factor of a prediction signal of a sample is determined based on weighting factors of corresponding neighboring samples of the sample.

2. The method of clause 1, wherein the rule specifies that, for a sample position (x, y), a weighting factor for above neighboring samples is $wT[y]=N1>>((y<<N2)>>nScale)$, and wherein $nScale=((Log\ 2(W)+Log\ 2(H)-N3)>>N4)$, and wherein N1, N2, N3 and N4 are non-negative integers.

3. The method of clause 2, wherein the above neighboring samples include a position (x, −1).

4. The method of clause 1, wherein the rule specifies that, for a sample position (x, y), a weighting factor for left neighboring samples is $wL[x]=N1>>((x<<N2)>>nScale)$, wherein $nScale=((Log\ 2(W)+Log\ 2(H)-N3)>>N4)$ and N1, N2, N3 and N4 are non-negative integers.

5. The method of clause 4, wherein the left neighboring samples includes a position (−1, y).

6. The method of clause 1, wherein the rule specifies that, for a sample position (x, y), a weighting factor for a top-left neighboring sample is zero.

7. The method of clause 6, wherein a position of the top-left neighboring sample is (−1, −1).

8. The method of any of clauses 2 to 5, wherein, N1=32, N2=1, N3=2, or N4=2.

9. The method of any of clauses 1 to 8, wherein the performing of the conversion includes generating the coded representation from the current video block.

10. The method of any of clauses 1 to 8, wherein the performing of the conversion includes generating the current video block from the coded representation.

11. A video processing apparatus comprising a processor configured to implement a method recited in any one or more of clauses 1 to 10.

12. A computer readable medium storing program code that, when executed, causes a processor to implement a method recited in any one or more of clauses 1 to 10.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g, code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:

generating, for a conversion between a current video block of a video and a bitstream of the video, predicted samples of the current video block, generating, using a position-dependent intra prediction sample filtering process, modified predicted samples of the current video block, and performing the conversion based on the modified predicted samples, wherein in the filtering process, a first predicted sample and at least one neighboring sample of the current video block are combined to generate a modified first predicted sample based on a weighting factor of the first predicted sample and at least one weighting factor of the at least one neighboring sample, and wherein in case that the current video block is coded using one of INTRA_ANGULAR18, INTRA_ANGULAR50, a planar mode or a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from only dimensions of the current video block and a position of the first predicted sample, wherein in case that the current video block is coded using an intra prediction mode greater than INTRA_ANGULAR50, or is coded using an intra prediction mode less than INTRA_ANGULAR18 and not equal to a planar mode and not equal to a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from more than dimensions of the current video block and a position of the first predicted sample, wherein in case that the current video block is coded using an intra prediction mode greater than INTRA_ANGULAR18 and less than INTRA_ANGULAR50, the filtering process is disallowed for the current video block, wherein in case that the current video block is coded using a DC mode, for a position (x, y) of the first predicted sample, a weighting factor for a top-left neighboring sample is zero.

2. The method of claim 1, wherein the dimensions of the current video block include a width and a height of the current video block.

3. The method of claim 1, wherein in case that the current video block is coded using one of INTRA_ANGULAR18, INTRA_ANGULAR50, a planar mode or a DC mode, for a position (x, y) of the first predicted sample, a weighting factor for an above neighboring sample of the at least one neighboring sample is wT[y]=N1>>((y<<N2)>>nScale),
  wherein nScale=((Log 2(W)+Log 2(H)−N3)>>N4),
  where W denotes a width of the current video block,
  where H denotes a height of the current video block, and
  where N1, N2, N3 and N4 are non-negative integers.

4. The method of claim 3, wherein the above neighboring sample is a sample located in position (x, −1).

5. The method of claim 3, wherein for a position (x, y) of the first predicted sample, a weighting factor for a left neighboring sample of the at least one neighboring sample is wL[x]=N1>>((x<<N2)>>nScale).

6. The method of claim 5, wherein the left neighboring sample is a sample located in position (−1, y).

7. The method of claim 5, wherein, N1=32, N2=1, N3=2, or N4=2.

8. The method of claim 1, wherein the conversion includes encoding the current video block into the bitstream.

9. The method of claim 1, wherein the conversion includes decoding the current video block from the bitstream.

10. The method of claim 1, wherein in case that the current video block is coded using an intra prediction mode greater than INTRA_ANGULAR50, or is coded using an intra prediction mode less than INTRA_ANGULAR18 and not equal to a planar mode and not equal to a DC mode, the at least one weighting factor of the at least one neighboring sample is further determined from a variable of invAngle, wherein the variable of invAngle is determined based on the intra prediction mode.

11. The method of claim 10, wherein in case that the current video block is coded using an intra prediction mode greater than INTRA_ANGULAR50, the at least one weighting factor of the at least one neighboring sample is determined from Min(2, Log 2(H)−Floor(Log 2(3*invAngle−2))+8),
  where Floor(x) specifies the largest integer less than or equal to x, and
  where H denotes a height of the current video block.

12. The method of claim 10, wherein in case that the current video block is coded using an intra prediction mode less than INTRA_ANGULAR18 and not equal to a planar mode and not equal to a DC mode, the at least one weighting factor of the at least one neighboring sample is determined from Min(2, Log2(W)−Floor(Log 2(3*invAngle−2))+8), wherein Floor(x) specifies the largest integer less than or equal to x,
  where Floor(x) specifies the largest integer less than or equal to x, and
  where W denotes a width of the current video block.

13. An apparatus for processing video data comprising a processor and a non-transitory memory with instructions thereon, wherein the instructions upon execution by the processor, cause the processor to:
  generate, for a conversion between a current video block of a video and a bitstream of the video, predicted samples of the current video block,
  generate, using a position-dependent intra prediction sample filtering process, modified predicted samples of the current video block, and
  perform the conversion based on the modified predicted samples,
  wherein in the filtering process, a first predicted sample and at least one neighboring sample of the current video block are combined to generate a modified first predicted sample based on a weighting factor of the first predicted sample and at least one weighting factor of the at least one neighboring sample, and
  wherein in case that the current video block is coded using one of INTRA_ANGULAR18, INTRA_ANGULAR50, a planar mode or a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from only dimensions of the current video block and a position of the first predicted sample,
  wherein in case that the current video block is coded using an intra prediction mode greater than INTRA_ANGULAR50, or is coded using an intra prediction mode less than INTRA_ANGULAR18 and not equal to a planar mode and not equal to a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from more than dimensions of the current video block and a position of the first predicted sample,
  wherein in case that the current video block is coded using an intra prediction mode greater than INTRA_ANGULAR18 and less than INTRA_ANGULAR50, the filtering process is disallowed for the current video block,
  wherein in case that the current video block is coded using a DC mode, for a position (x, y) of the first predicted sample, a weighting factor for a top-left neighboring sample is zero.

14. The apparatus of claim 13, wherein the dimensions of the current video block include a width and a height of the current video block.

15. The apparatus of claim 13, wherein, in case that the current video block is coded using one of INTRA_ANGULAR18, INTRA_ANGULAR50, a planar mode or a DC mode, for a position (x, y) of the first predicted sample, a weighting factor for an above neighboring sample of the at least one neighboring sample is wT[y]=N1>>((y<<N2)>>nScale),
  wherein nScale=((Log 2(W)+Log 2(H)−N3)>>N4),
  where W denotes a width of the current video block,
  where H denotes a height of the current video block, and
  where N1, N2, N3 and N4 are non-negative integers.

16. The apparatus of claim 15, wherein the above neighboring sample is a sample located in position (x, −1).

17. The apparatus of claim 15, wherein for a position (x, y) of the first predicted sample, a weighting factor for a left neighboring sample of the at least one neighboring sample is wL[x]=N1>>((x<<N2)>>nScale).

18. The apparatus of claim 17, wherein the left neighboring sample is a sample located in position (−1, y).

19. A non-transitory computer-readable storage medium storing instructions that cause a processor to:
  generate, for a conversion between a current video block of a video and a bitstream of the video, predicted samples of the current video block, generate, using a position-dependent intra prediction sample filtering process, modified predicted samples of the current video block, and perform the conversion based on the modified predicted samples, wherein in the filtering process, a first predicted sample and at least one neighboring sample of the current video block are combined to generate a modified first predicted sample based on a weighting factor of the first predicted sample and at least one weighting factor of the at least one neighboring sample, and wherein in case that the current video block is coded using one of INTRA_ANGULAR18, INTRA_ANGULAR50, a planar mode or a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from only dimensions of the current video block and a position of the first predicted sample, wherein in case that the current video block is coded using an intra prediction mode greater than INTRA_ANGULAR50, or is coded using an intra prediction mode less than INTRA_ANGULAR18 and not equal to a planar mode and not equal to a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from more than dimensions of the current video block and a position of the first predicted sample, wherein in case that the current video block is coded using an intra prediction mode greater than INTRA_ANGULAR18 and less than INTRA_ANGULAR50, the filtering process is disallowed for the current video block, wherein in case that the current video block is coded using a DC mode, for a position (x, y) of the first predicted sample, a weighting factor for a top-left neighboring sample is zero.

20. A non-transitory computer-readable recording medium storing a bitstream of a video which is generated by a method performed by a video processing apparatus, wherein the method comprises:

generating predicted samples of a current video block of the video, generating, using a position-dependent intra prediction sample filtering process, modified predicted samples of the current video block, and generating the bitstream based on the modified predicted samples, wherein in the filtering process, a first predicted sample and at least one neighboring sample of the current video block are combined to generate a modified first predicted sample based on a weighting factor of the first predicted sample and at least one weighting factor of the at least one neighboring sample, and wherein in case that the current video block is coded using one of INTRA_ANGULAR18, INTRA_ANGULAR50, a planar mode or a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from only dimensions of the current video block and a position of the first predicted sample, wherein in case that the current video block is coded using an intra prediction mode greater than INTRA_ANGULAR50, or is coded using an intra prediction mode less than INTRA_ANGULAR18 and not equal to a planar mode and not equal to a DC mode, a width of the current video block is greater than or equal to 4 and a height of the current video block is greater than or equal to 4, a reference line index is equal to 0, and a bdpcm flag is equal to 0, the filtering process is allowed for the current video block, and the at least one weighting factor of the at least one neighboring sample is determined from more than dimensions of the current video block and a position of the first predicted sample, wherein in case that the current video block is coded using an intra prediction mode greater than INTRA_ANGULAR18 and less than INTRA_ANGULAR50, the filtering process is disallowed for the current video block;

wherein in case that the current video block is coded using a DC mode, for a position (x, y) of the first predicted sample, a weighting factor for a top-left neighboring sample is zero.

* * * * *